(12) United States Patent
Pandey

(10) Patent No.: US 11,915,062 B2
(45) Date of Patent: Feb. 27, 2024

(54) SERVER INSTANCE INTROSPECTION FOR SHARED RESOURCE COLLISIONS USING CALL STACK DEPENDENCIES

(71) Applicant: Oracle International Corporation, Redwood Shores, CA (US)

(72) Inventor: Pradip Kumar Pandey, Highlands Ranch, CO (US)

(73) Assignee: Oracle International Corporation, Redwood Shores, CA (US)

( * ) Notice: Subject to any disclaimer, the term of this patent is extended or adjusted under 35 U.S.C. 154(b) by 139 days.

(21) Appl. No.: 17/125,319

(22) Filed: Dec. 17, 2020

(65) Prior Publication Data

US 2022/0197717 A1 Jun. 23, 2022

(51) Int. Cl.
*G06F 9/52* (2006.01)
*G06F 9/48* (2006.01)
*G06F 9/50* (2006.01)
*G06F 11/34* (2006.01)

(52) U.S. Cl.
CPC ............... *G06F 9/52* (2013.01); *G06F 9/48* (2013.01); *G06F 9/4881* (2013.01); *G06F 9/50* (2013.01); *G06F 9/5011* (2013.01); *G06F 9/5027* (2013.01); *G06F 9/5083* (2013.01); *G06F 11/34* (2013.01); *G06F 11/3409* (2013.01); *G06F 11/3466* (2013.01)

(58) Field of Classification Search
CPC . G06F 9/48; G06F 9/4881; G06F 9/50; G06F 9/5011; G06F 9/5027; G06F 9/5083; G06F 9/52; G06F 11/34; G06F 11/3409; G06F 11/3466
See application file for complete search history.

(56) References Cited

U.S. PATENT DOCUMENTS 6,167,424 A * 12/2000 Bak ................. G06F 9/4488
707/999.103
6,735,760 B1 * 5/2004 Dice ................... G06F 9/52
717/151
8,839,209 B2 9/2014 Gallagher et al.
9,098,333 B1 8/2015 Little et al.
(Continued)

OTHER PUBLICATIONS

Enterprise Server Instance Architecture, Micro Focus, Available Online at: https://www.microfocus.com/documentation/enterprise-developer/ed50pu7/ES-WIN/BKCACAINTRU005.html, Accessed from Internet on Dec. 23, 2020, 2 pages.
(Continued)

*Primary Examiner* — Charles M Swift
(74) *Attorney, Agent, or Firm* — Kilpatrick Townsend & Stockton LLP

(57) ABSTRACT

A tool may provide a real-time analysis of potential bottlenecks while threads wait on locks held by other threads. For each job currently operating on the server instance, the tool may access a list of threads and retrieve call stacks associated with those threads. The call stacks may then be analyzed to identify threads that are holding a lock, along with any corresponding threads that are waiting on the lock. The locks may be held on memory resources or any other type of computing resource. These bottlenecks may be identified and an adjustment of the configuration of the server instance may be triggered in response that is configured to reduce the likelihood that these types of bottlenecks may occur in the future.

20 Claims, 16 Drawing Sheets

(56) References Cited

U.S. PATENT DOCUMENTS

| | | | | |
|---|---|---|---|---|
| 2001/0039609 | A1* | 11/2001 | Houldsworth | G06F 12/0261 |
| | | | | 711/170 |
| 2007/0067777 | A1* | 3/2007 | Branda | G06F 9/52 |
| | | | | 718/107 |
| 2011/0016357 | A1 | 1/2011 | Tsvetkov | |
| 2016/0085657 | A1* | 3/2016 | Braun | G06F 11/0715 |
| | | | | 714/38.11 |
| 2017/0060736 | A1* | 3/2017 | Lin | G06F 12/0284 |
| 2017/0337004 | A1* | 11/2017 | Zhao | G06F 3/0647 |
| 2018/0007073 | A1* | 1/2018 | Boutnaru | H04L 63/1425 |
| 2019/0205174 | A1* | 7/2019 | Phelan | G06F 12/0802 |
| 2022/0138069 | A1* | 5/2022 | Hulick, Jr. | G06F 11/3409 |
| | | | | 702/186 |

OTHER PUBLICATIONS

How to Analyze Performance Diagnostics (Thread Dumps, Heap Dumps, Garbage Collection Logs), Atlassian, Available Online at: https://confluence.atlassian.com/jirakb/how-to-analyze-performance-diagnostics-thread-dumps-heap-dumps-garbage-collection-logs-973502191.html, Jul. 2, 2019, 4 pages.

Performance Counters, Micro Focus, Available Online at: https://www.microfocus.com/documentation/enterprise-developer/ed50pu7/ES-WIN/BKCACAMMSWS003.html, Accessed from Internet on Dec. 23, 2020, 1 page.

SUSE Linux Enterprise Server 15 SP1 System Analysis and Tuning Guide, SUSE, Available Online at: https://documentation.suse.com/sles/15-SP1/single-html/SLES-tuning/index.html#cha-tuning-oprofile, Dec. 18, 2020, 246 pages.

Troubleshoot Jira Server Performance with Thread Dumps, Atlassian, Available Online at: https://confluence.atlassian.com/jirakb/troubleshoot-jira-server-performance-with-thread-dumps-644874457.html, Sep. 25, 2019, 3 pages.

Baydan; Ismail, "Atop Command Tutorial with Examples", Poftut, Available Online at: https://www.poftut.com/atop-command-tutorial-examples-monitor-linux-system-meterics/, Dec. 3, 2017, 11 pages.

James; Hayden, "Analyzing Linux Server Performance with Atop", Redhat, Available Online at: https://www.redhat.com/sysadmin/analyzing-linux-server-performance-atop, Oct. 15, 2019, 4 pages.

Winkel et al., "One-stop Performance Analysis using Atop", LWN.net, Available Online at: https://lwn.net/Articles/387202/, May 12, 2010, 8 pages.

\* cited by examiner

SERVER INSTANCE INTROSPECTION FOR SHARED RESOURCE COLLISIONS USING CALL STACK DEPENDENCIES

BACKGROUND

Server instances may be designed to handle many different types of workloads. A diverse set of workloads may be received by the server instance from a large number of different client devices. To simultaneously service thousands of workload requests from users, a server instance may employ a large number of kernels that operate in parallel. Each of these kernels may further include multiple threads that operate in parallel. This large-scale parallel processing on a single server instance allows thousands of workloads to be processed at a time.

However, increasing the number of kernels and threads operating on a server instance may also generate a number of technical problems. During peak usage intervals, operating system resource contention may become severe for resources such as memory, processing power, disk space, shared memory, and so forth. Contention over these resources may cause performance issues when processing a large number of work loads. Often, performance bottlenecks will occur and be alleviated before a robust analysis of the underlying cause can be performed at the server instance. These performance bottlenecks then tend to recur without warning in the future. Furthermore, contention over server resources is often not revealed by analyzing the performance of individual processes without the context of other threads competing for those resources.

BRIEF SUMMARY

A tool may be operated in conjunction with a server instance to provide a real-time analysis of potential bottlenecks caused by threads waiting on locks held by other threads. The tool may query the server instance for a list of jobs currently operating on the server instance. For each job currently operating on the server instance, the tool may access a list of threads operating for each of the jobs on a kernel. The tool may then retrieve call stacks associated with the threads. The call stacks for the running threads may then be analyzed to identify (1) threads that are holding a lock, and (2) any corresponding threads that are waiting on the lock. These bottlenecks may be identified and corrective action may be taken in the configuration of the server.

Corrective action may include triggering an adjustment of the configuration of the server instance in response to identifying a first thread waiting for a lock held by a second thread. For example, contention over shared memory locations in a shared memory may result in an increase in a memory threshold. When threads share values that are less than this threshold, these values may be passed as parameters or direct messages rather than using shared memory, which in turn may reduce the collisions over the shared memory locations. In another example, contention over shared files in a shared disk may result in an increase in the number of server instances that are operating on a platform. This allows batch processes to be distributed to different server instances to reduce the number of batch processes waiting for metadata processes that prepare disk space for batch results.

Relationships and dependencies between threads may be identified using patterns that are executed against the text strings in the call stacks. Each of the call stacks may include a number of text strings that identify return addresses and functions called by the associated thread, along with statuses that identify locks that are held, locks on which the thread is waiting, and/or whether the thread is currently assigned to a job at all. Patterns may be defined in multiple portions. For example, a first portion may identify threads that hold a lock on memory locations, and a second portion may identify threads waiting for that lock to be released. One or more thread dependencies may be identified through the pattern analysis of the call stacks.

The tool may operate in real time, providing run-time changes to the configuration associated with the server instance to improve performance as a drop in performance is identified. The tool may also operate after performance issues have been alleviated, providing a post hoc analysis using a number of different snapshots in time of call stacks operating on the server instance. By analyzing multiple snapshots of call stacks, patterns that identify relationships between call stacks may be developed that were not previously known. This allows the tool to be adaptive to new resource bottlenecks as they occur.

Each of the patterns may also be associated with a configuration change configured to reduce the occurrence of these resource collisions. These adjustments to the configuration can reduce the likelihood that these types of bottlenecks may occur in the future. This improves the functioning of the server instance by generating a higher throughput of workloads and jobs that can be handled. This also reduces the number of threads in a "waiting" state, which in turn improves the efficiency of the server instance. This also optimizes the number of server instances operating in parallel to minimize the lock bottlenecks.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
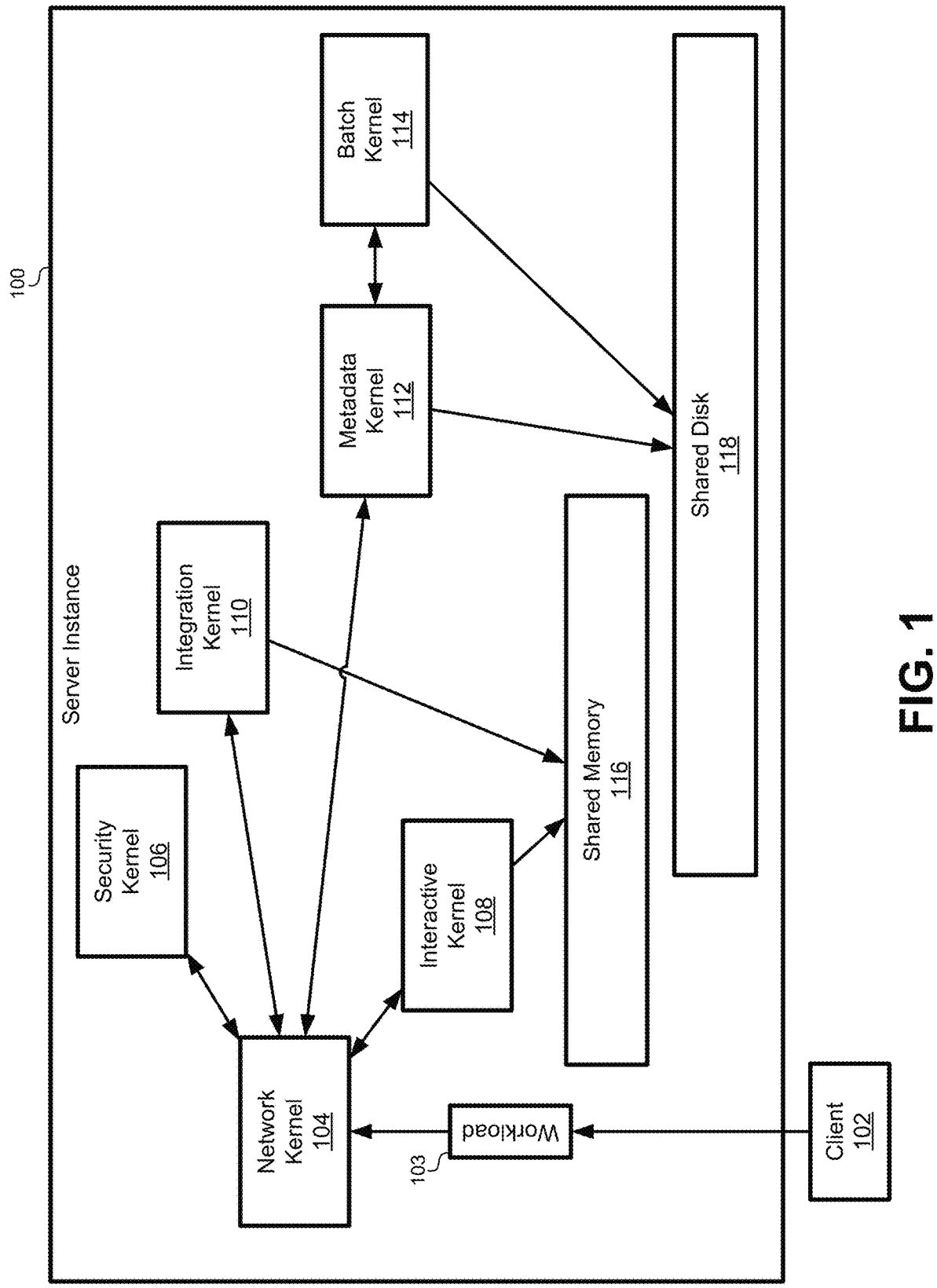
FIG. 1 illustrates a server instance that accepts workloads from client devices, according to some embodiments.

FIG. 1 illustrates a server instance 100 that accepts workloads from client devices, according to some embodiments. The server instance 100 may include a virtual machine running in a cloud environment, such as a single Java-EE-compatible Java virtual machine hosting an application server on a node. In some cases, the server instance 100 may be a member of a cluster and may share applications, resources, and configurations with the cluster. In other cases, the server instance 100 need not belong to a cluster, and as such may have an independent set of applications, resources, and configurations. For example, the server instance 100 may include Web servers, web containers, messaging services, and/or a runtime control for managing multiple processes/threads that are shared or exclusive to the server instance 100.

Many different processes and components may be part of the server instance 100. In the example of FIG. 1, the server instance 100 may include a plurality of kernels. As used herein, each of the kernels may refer to a specific kernel in the traditional computing sense as a process that interfaces between the virtual or real hardware layer of the server instance 100 and the application layer. Each of the kernels may be designed to handle specific types of applications or jobs. For example, the server instance 100 may include a security kernel 106 to handle security procedures and enforce access to secure computing resources. The server instance 100 may also include a network kernel 104 that acts as an interface between an external network and the other kernels in the server instance 100. Other kernel types may include an interactive kernel 108, an integration kernel 110, a metadata kernel 112, a batch kernel 114, and/or other kernels not specifically illustrated in FIG. 1. Each of these kernels may be designed to perform specific functions, such as executing workloads that are submitted by client devices.

A client device 102 may submit a workload 103 to the server instance 100 for processing. Once received, the workload 103 may be referred to herein as a "job" to be executed by one or more of the kernels in the server instance 100. For example, the workload 103 may be received by the network kernel 104, which may act as a router and/or load balancer for the server instance 100. The network kernel 104 may determine which of the remaining kernels in the server instance 100 is qualified and/or available to handle processing one or more jobs represented by the workload 103. The network kernel 104 may then distribute the jobs to one or more of the remaining kernels. In some cases, the workload 103 may be split into multiple jobs that are handled by multiple kernels. For example, a job of batch transactions may be submitted to the metadata kernel 112 to prepare disk space for the results of the batch processing before passing the job to the batch kernel 114. Similarly, the integration kernel 110 may execute a job for the workload 113 before the interactive kernel 108 executes another job for the workload 113. Thus, the workload 103 may be processed by multiple kernels in the server instance 100, and dependencies between the jobs executed by multiple kernels may exist such that one kernel may need to wait on the execution of another kernel before processing a job.

In order to facilitate the processing of multiple jobs associated with the same workload 103, shared resources may be used in the server instance 100. In this example, a shared memory 116 and/or a shared disk 118 may be used by multiple kernels performing jobs for the same workload 103. For example, the interactive kernel 108 may write to a memory location in the shared memory 116 for the workload 103. After the interactive kernel 108 has completed the write operation, the integration kernel 110 may read that memory location to perform another job related to the workload 103. As described below, the portion of the shared memory 116 that is shared between the jobs executed by the interactive kernel 108 and the integration kernel 110 may be locked during a write operation such that other kernels do not try to read from the shared memory location until the lock is released.

In another example, the metadata kernel 112 may prepare a portion of the shared disk 118 for receiving results of the batch process. The batch job to be executed by the batch kernel 114 may generally wait until the disk location has been prepared on the shared disk 118 by the metadata kernel 112. After the disk location on the shared disk 118 is ready, the batch kernel 114 may begin writing to the shared disk 118 as results are generated. Batch processes may include batch transactions, repeated calculations, and/or any other similar transactions. As the metadata kernel 112 uses the shared disk 118, a lock may be placed on that portion of the shared disk 118. The batch kernel 114 may then wait until the lock is released and/or the process executed by the metadata kernel 112 has completed before processing its own job.

The example of FIG. 1 may be greatly simplified in terms of the number of workloads, jobs, and/or kernels that may be simultaneously processed and executed by the server instance 100. On a single server instance, hundreds kernels may simultaneously handle hundreds or even thousands of submitted workloads from hundreds or thousands of client devices. Hundreds of different kernels may all compete for the same shared memory 116 and/or shared disk 118. As the number of requests from client devices increases, the more the shared memory 116 and/or shared disk 118 may become a bottleneck in performance. As more kernels wait for shared memory locations or shared files, the more inefficient the execution of the server instance 100 becomes.

Figure 2:
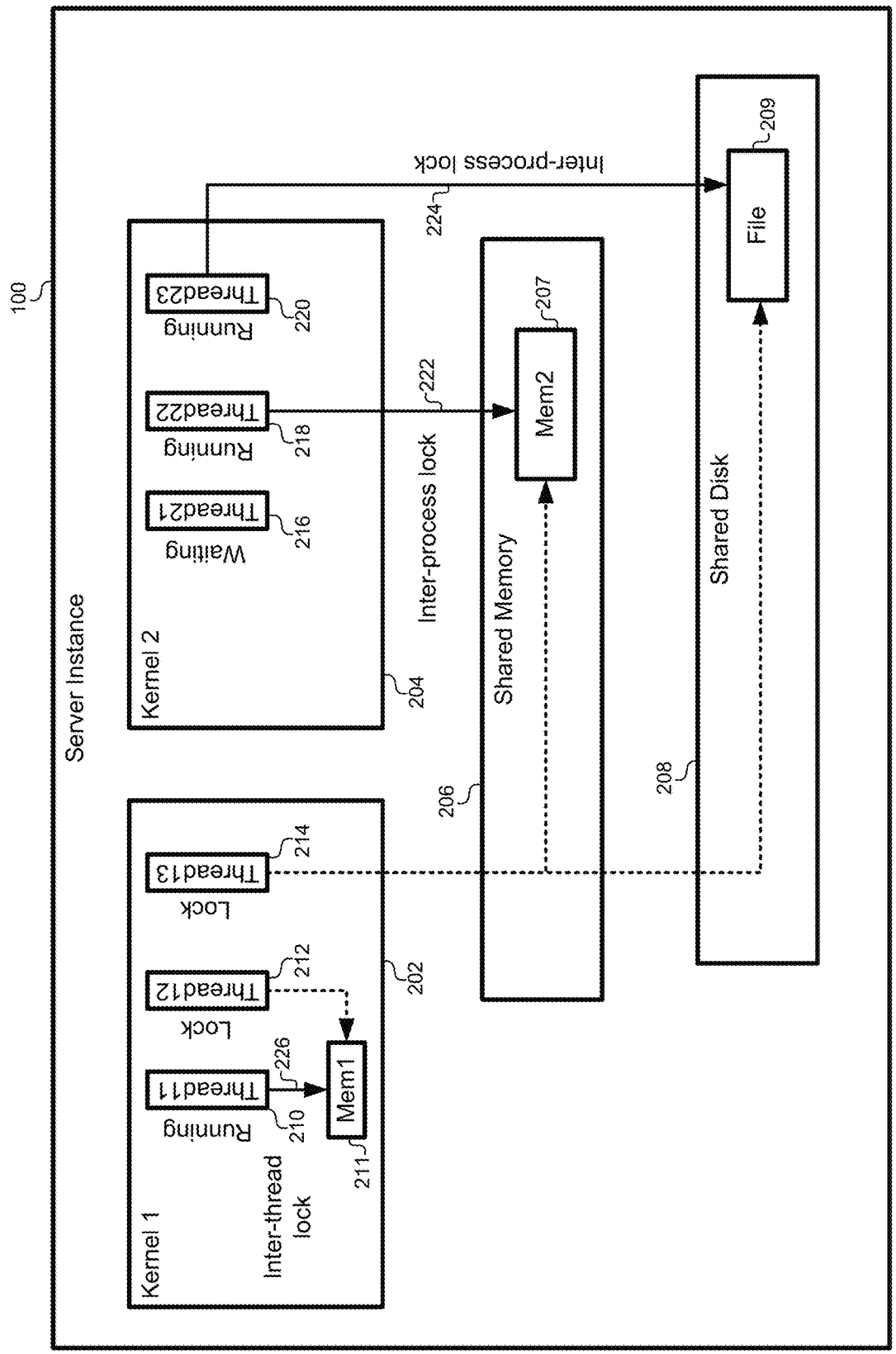
FIG. 2 illustrates an example of the different types of locks that may be active in the server instance, according to some embodiments.

FIG. 2 illustrates an example of the different types of locks that may be active in the server instance 100, according to some embodiments. One or more threads may execute in each of the kernels performing a job in the server instance 100. Each of these threads may operate in parallel to perform different aspects of the job executed by the kernel. In this example, the server instance 100 includes kernel 202 executing threads 210, 212, 214. The server instance may also include kernel 204 executing threads 216, 218, 220. It is to be understood that the server instance 100 may include many additional kernels that are not explicitly illustrated in FIG. 2. Additionally, each of the kernels 202, 204 may include additional threads that are not explicitly illustrated in FIG. 2.

Each of the kernels 202, 204 may have an internal memory that may be shared between each of the threads executing within that specific kernel. For example, kernel 202 may include a shared memory 211. Each of the threads 210, 212, 214 in kernel 202 may write/read information to/from the shared memory 211. Using the shared memory 211 may be a more efficient way of sharing data between parallel threads when compared to direct messaging or parameter passing. When a thread needs read and/or write access to the shared memory 211, a lock may be placed on the shared memory 211 to prevent other threads in the kernel 202 from simultaneously reading and/or writing to at least that portion of the shared memory 211. For example, when thread 210 needs to write to the shared memory 211, thread 210 may acquire a lock 226 on the shared memory 211. This lock 226 may encompass the entire shared memory 211, or alternatively may encompass only a defined subset of the shared memory 211 used by thread 210. While the lock 226 is active for the shared memory 211, other threads in the kernel 202 may be prevented from accessing at least the locked portion of the shared memory 211. For example, if thread 212 attempts to access the shared memory 211 while the lock 226 is active, the thread 212 may instead enter a wait state or a "lock" state until the lock 226 is released. In some embodiments, the execution of thread 212 may pause while in the "lock" state until the lock 226 is released. This type of lock 226 may be referred to as an inter-thread lock.

In addition to the inter-thread lock 226 for the shared memory 211 inside of kernel 202, some embodiments may also use inter-process locks on a shared memory 206 within the server instance 100. In contrast to shared memory 211, shared memory 206 is not exclusive to a particular kernel. Instead, shared memory 206 may be shared between any of the kernels operating in the server instance 100. Shared memory 206 may be used to communicate results between different kernels that execute related jobs in parallel. For example, multiple jobs related to the same workload may execute on different kernels, and data may be shared between these kernels using the shared memory 206.

When an inter-process lock is requested, the shared memory 206 may lock a specific memory location 207 in the shared memory 206 related to the lock. For example, when thread 218 in kernel 204 requests the lock 222, the shared memory 206 may prevent other threads and/or kernels from accessing the memory location 207. Note that the memory location may include a memory block that includes multiple individual memory locations. Like thread 210 in the example above, thread 218 may be assigned a state of "running" or "active" indicating that the thread 218 is executing and not waiting on any other lock. If a thread in kernel 204 and/or a thread in another kernel attempts to access the memory location 207 while the lock 222 is active, the waiting thread may indicate a "lock" status until the lock 222 is released. For example, thread 214 in kernel 202 may have a "lock" status until the lock 222 is released and thread 214 may access the memory location 207.

Inter-process locks may be used on the shared memory 206, and they may also be used on a shared disk 208. As described above, multiple kernels may be involved when allocating, preparing, writing, and/or reading to a file 209 on the shared disk 208. A metadata kernel may prepare the file 209, while a batch kernel may write results to the file 209. To avoid collisions while accessing the file 209, a lock 224 may be granted to one kernel at a time. For example, thread 220 in kernel 204 may represent a thread in a metadata kernel that is preparing the file 209. The lock 224 may prevent thread 214 in kernel 202 representing a batch kernel from writing results to the file 209 until the lock 224 is released.

Each of the threads in a kernel may be part of a job that is executing on that kernel. Each of the threads may also be associated with a particular status that is updated in real time as the thread executes. Among the different threat statuses that may be assigned are the "running" status indicating that the thread is executing and not waiting on any locks to be released, the "lock" status indicating that the thread is paused and waiting for a lock to be released, and a "waiting" status indicating that the thread is not executing and is waiting for a job to be assigned to the thread. Note that each of the threads in a kernel may be assigned the "waiting" status if a job has not yet been assigned to the kernel. These statuses may be available in a call stack for each of the threads. For example, a call stack for thread 212 may indicate that thread 212 is in a "lock" state waiting for the shared memory 211 to be released from the lock 226 held by thread 210.

An efficiency bottleneck may be caused by threads/kernels waiting on locked memory locations and files, which may represent a technical problem in the technology of server instances. First, multiple threads may be paused in their execution waiting for a single thread to release a lock on a shared memory location. This may decrease an amount of parallel processing that can actually be performed by multiple threads and/or multiple kernels. Additionally, as the execution time for jobs related to a workload are extended, client devices may wait to submit new workloads to the server instance 100. As new workloads are delayed, some kernels and/or threads may languish in the "waiting" state when they could be receiving new jobs for new workloads. In both cases, identifying "running" and "lock" relationships between threads that are sharing memory locations is beneficial to reduce these memory collisions and increase the throughput of the server instance 100.

The embodiments described herein solve these and other technical problems for server instances by providing a real-time analysis of potential bottlenecks while threads wait on locks held by other threads. A tool may query the server instance for a list of jobs currently operating on the server instance. For each job currently operating on the server instance, the tool may access a list of threads operating for each of the jobs on a kernel. The tool may then retrieve call stacks associated with the threads. The call stacks for the running threads may then be analyzed to identify (1) threads that are holding a lock, and (2) any corresponding threads that are waiting on the lock. These bottlenecks may be identified and corrective action may be taken in the configuration of the server. For example, some embodiments may trigger an adjustment of the configuration of the server instance in response to identifying a first thread waiting for a lock held by a second thread. These adjustments to the configuration can reduce the likelihood that these types of bottlenecks may occur in the future. This improves the functioning of the server instance 100 by generating a higher throughput of workloads and jobs that can be handled. This also reduces the number of threads in a "waiting" state, which in turn improves the efficiency of the server instance. As will be described below, this also optimizes the number of server instances operating in parallel to minimize the lock bottlenecks.

Figure 3:
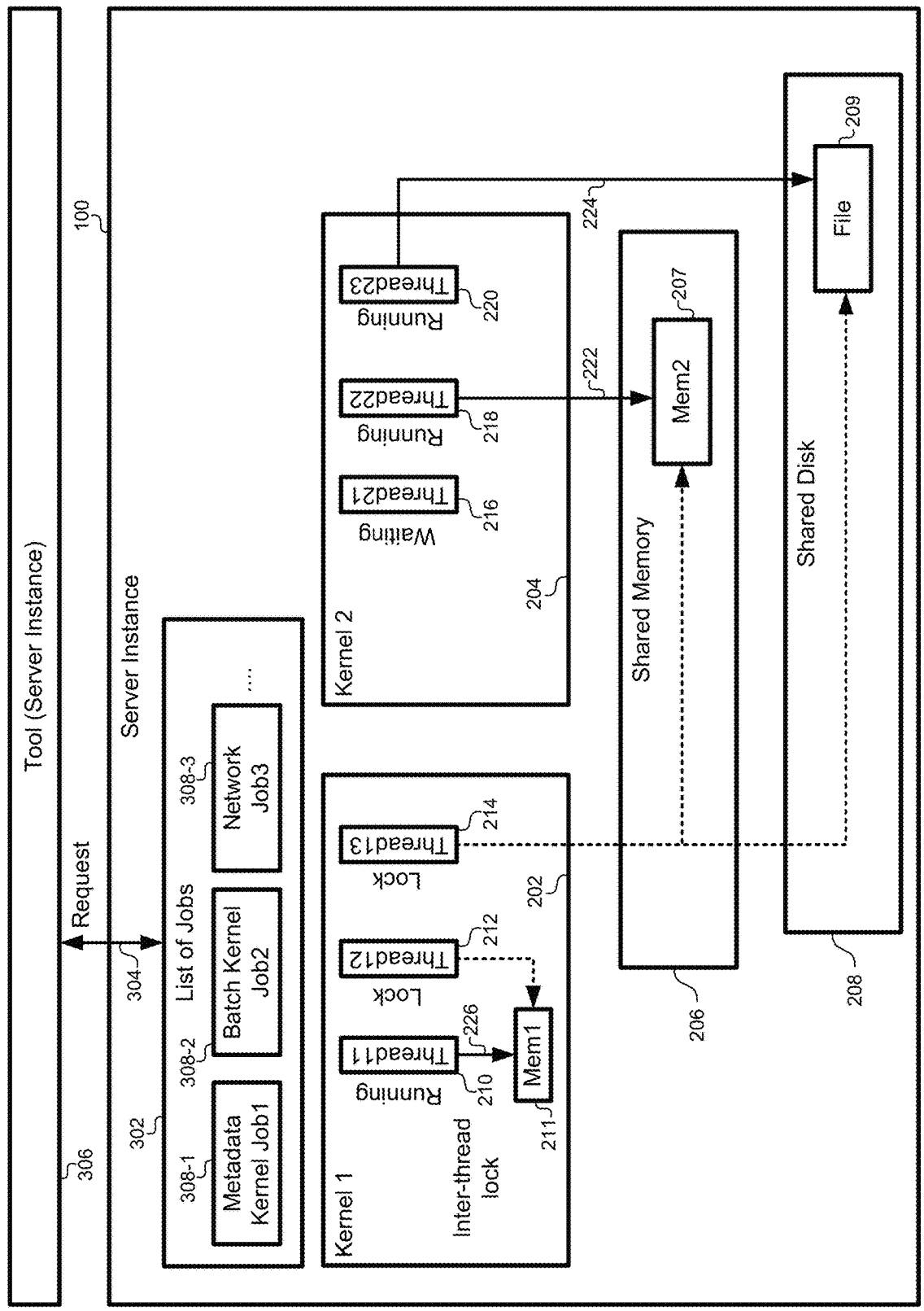
FIG. 3 illustrates how a tool may receive a list of jobs from a server instance, according to some embodiments.

FIG. 3 illustrates how a tool 306 may receive a list of jobs 302 from a server instance 100, according to some embodiments. The tool 306 may operate as a separate entity (such as a separate server instance) from the server instance 100. This allows the tool 306 to operate independently of the server instance 100. It also ensures that the tool 306 does not interfere with the operation of the server instance 100 or divert any of the bandwidth or processing power normally used by the server instance 100. Although not shown in FIG. 3, some embodiments may alternatively allow the tool 306 to operate as a process on the server instance 100. For example, the tool 306 may operate on a dedicated kernel on the server instance 100.

The tool 306 may submit a request 304 to the server instance 100 to return a list of jobs 302 currently operating on the server instance 100. Generally, server instances may maintain a runtime list of jobs that are currently executing on kernels on the server instances. As new jobs are received for execution by kernels in the server instance 100, the list of jobs 302 may be updated in real time such that the list of jobs 302 reflects an accurate list of currently executing jobs. Similarly, when a kernel completes execution of a job, the job may be removed from the list of jobs 302 for the server instance 100. The list of jobs may be stored in a data structure, such as a list, array, vector, file, and/or the like stored by the server instance 100.

The tool 306 may maintain a list of server identifiers that serves to uniquely identify one or more server instances, such as server instance 100. The tool 306 may address the server instance 100 and submit a request 304 to return the list of jobs 302. In response, the server instance 100 may return the data structure containing a list of jobs 302 to the tool 306. Jobs in the list of jobs 302 may identify a specific kernel and an identifier for the job operating on that kernel. For example, the list of jobs 302 may include a "Job 1" operating on a metadata kernel 308-1, a "Job 2" operating on a batch kernel 308-2, a "Job 3" operating on a network kernel 308-3, and so forth.

In some embodiments, the tool 306 may maintain a copy of the list of jobs 302 locally at the tool 306. The copy of the list of jobs 302 may operate as a working copy for local processing at the tool 306. This may also allow the tool 360 reduce the number of requests made to the server instance 100 to update the list of jobs. For example, the tool 306 may request a list of jobs 302 and store it locally. During the next N times when the list of jobs 302 is needed by the tool 306, the tool 306 may retrieve data from its local copy rather than making another request from the server instance 100. On subsequent requests, the server instance 100 may return a list of changes to the list of jobs 302 rather than returning the entire list of jobs 302 itself. This list of changes may be applied to the local copy stored at the tool 306 to decrease the bandwidth of both the amount of data and the number of requests passes back and forth between the tool 306 and the server instance 100. This may be beneficial in practice, as the server instance 100 may have hundreds of jobs executing in parallel on the list of jobs 302.

Figure 4:
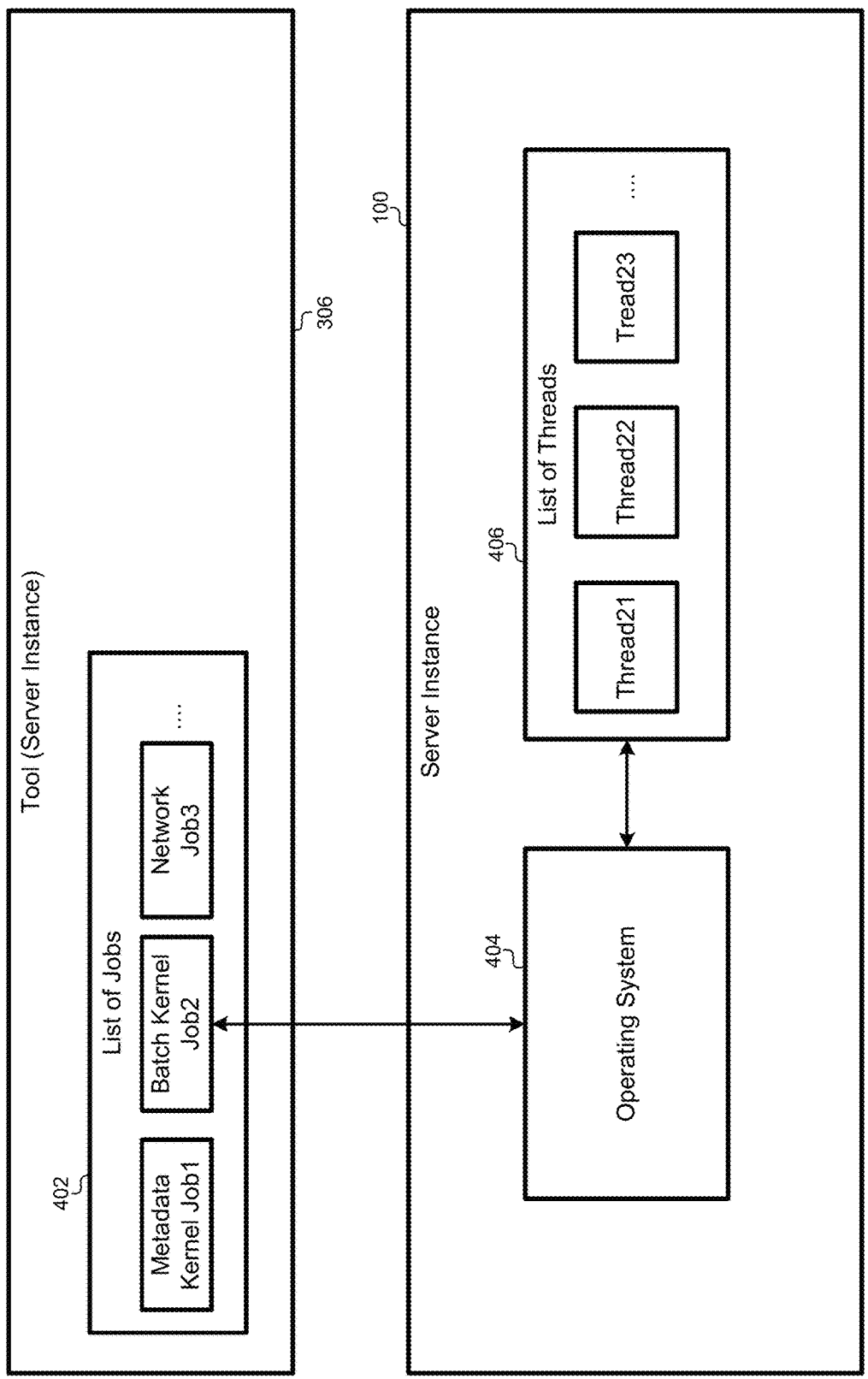
FIG. 4 illustrates how the tool may retrieve a list of threads for jobs executing at the server instance, according to some embodiments.

FIG. 4 illustrates how the tool 306 may retrieve a list of threads 406 for jobs executing at the server instance 100, according to some embodiments. Operating from a local copy of the list of jobs 402, the tool 306 may cycle through the jobs operating on kernels on the server instance 100. For each job, the tool 306 may submit a request to the operating system 404 executing on the server instance 100 to retrieve a list of threads 406 that are being executed as part of the particular job. This may be an operating-system-level request, as the operating system may maintain a list of threads currently operating.

Consider the example for "Job 2" operating on the batch kernel illustrated in FIG. 4. As the tool 306 cycles through the copy of the list of jobs 402 and arrives at the batch kernel executing "Job 2," the tool 306 may submit a request to the operating system 404 to retrieve a list of threads 406 that are operating on the batch kernel as part of "Job 2." The list of threads 406 may comprise a single thread or a plurality of individual threads. The list of threads 406 may then be passed back to the tool 306, where the list of threads 406 may be stored in a data structure that is indexed by the corresponding kernel and/or job. After cycling through the list of jobs 402, this allows the tool 306 to store an index of any and/or all of the threads currently operating on the server instance 100.

In some embodiments, the tool 306 may submit a single request for each job in the copy of the list of jobs 402. Each request may receive a response from the server instance 100 comprising a list of threads 406 currently operating for that job. Alternatively, some embodiments may submit a list of jobs to the operating system 404, and the operating system may return a list of threads that includes all threads running on jobs in the list sent from the tool 306. This may present an efficient alternative to sending repeated requests and responses between the tool 306 and the server instance 100. Furthermore, as described below, the list of threads may also be processed as a batch without requiring the tool 360 cycle individually through threads for each job.

Figure 5:
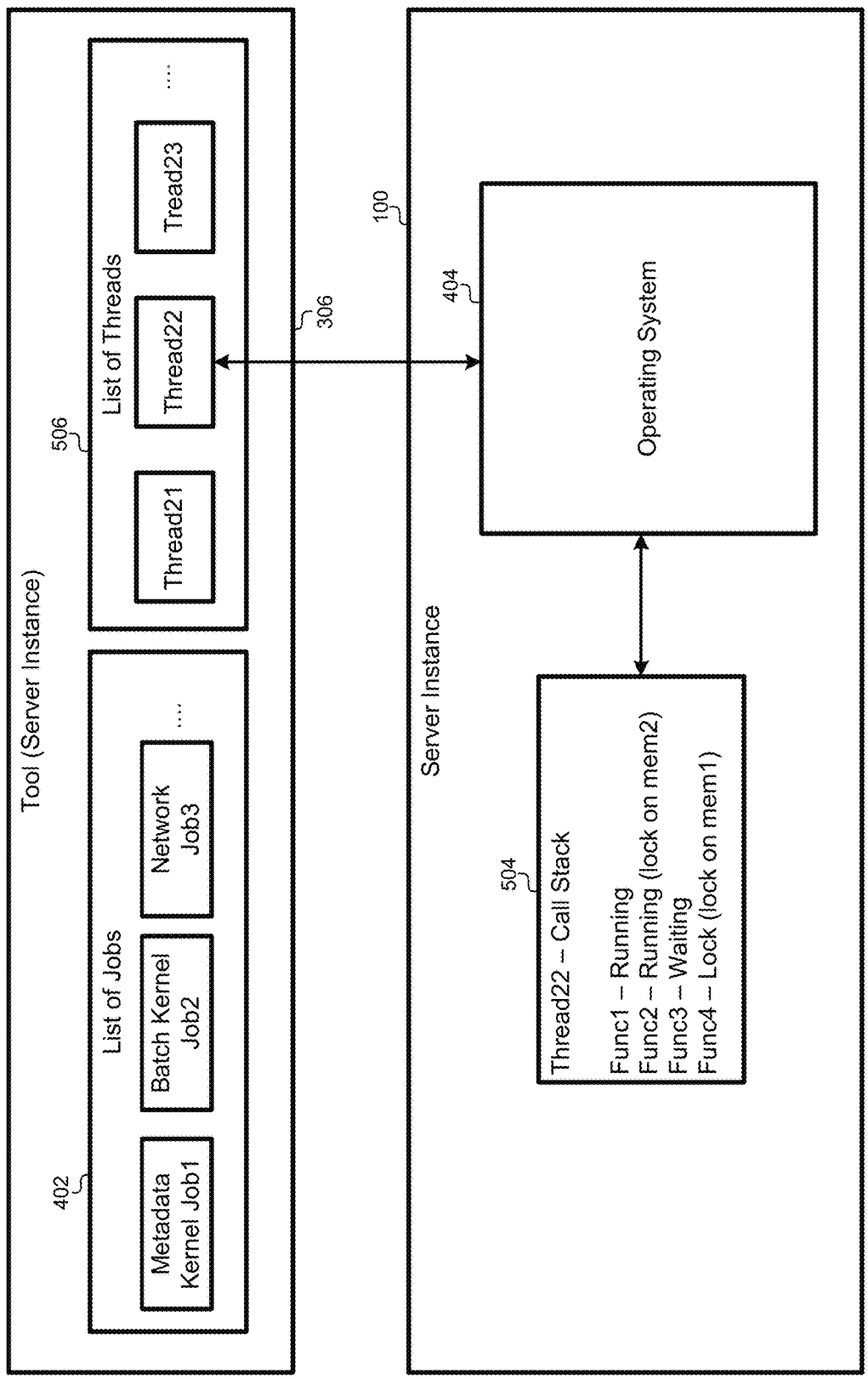
FIG. 5 illustrates how the tool may access call stacks that are associated with the threads that are being executed by job kernels at the server instance, according to some embodiments.

FIG. 5 illustrates how the tool 306 may access call stacks that are associated with the threads that are being executed by job kernels at the server instance, according to some embodiments. A call stack may include a stack data structure that stores information about the active subroutines (e.g., functions) called by a thread as it is being run. The call stack may also be referred to as an execution stack, a program stack, a control stack, a runtime stack, and so forth. The call stack may be used to track locations where subroutines should return control when they are finished executing. Some implementations of the call stack may simply store a return address that is pushed to the top of the call stack with each function call. However, some embodiments may include additional information, such as a function name and/or a function status for each function in the stack.

The tool 306 may cycle through a local copy of the list of threads 506 and submit requests to the operating system 404 to return a call stack for the thread referenced in the request. For example, the tool 306 may submit a request to the operating system 404 retrieve a call stack 504 associated with "Thread 22." Alternatively, the tool 306 may submit the copy of the list of threads 506 to the operating system 404 and return a list of call stacks associated with the threads in the list of threads. In another alternative, the request for the list of threads illustrated above in FIG. 4 and request for corresponding call stacks may be combined into a single operation. For example, the tool 306 may submit the copy of the list of jobs 402 to the operating system 404. The operating system 404 may then retrieve a list of threads and use the list of threads to retrieve call stacks for the running threads. The call stacks may then be returned to the tool 306.

As illustrated in FIG. 5, a call stack 504 may include a list of functions that have been called during operation of the corresponding thread. This list may be represented as one or more text strings. Each function may include a function name and/or a function status. As described above, the function status may represent statuses such as "Running" indicating that the thread is running and not waiting on a locked shared resource; "Running" with a listing of a shared resource that is currently locked by that thread (e.g., locked mem2 in the shared memory of the server instance 100); "Lock" with a listing of a shared resource that is currently locked by another thread and indicating that the thread is running but paused in its execution as it waits for the lock to be released; and/or "Waiting" indicating that the threat is not running but is instead waiting for a job to be assigned to the thread. The call stack 504 may be represented as a list of text strings, where each text string corresponds to a function/status in the call stack 504.

Figure 6:
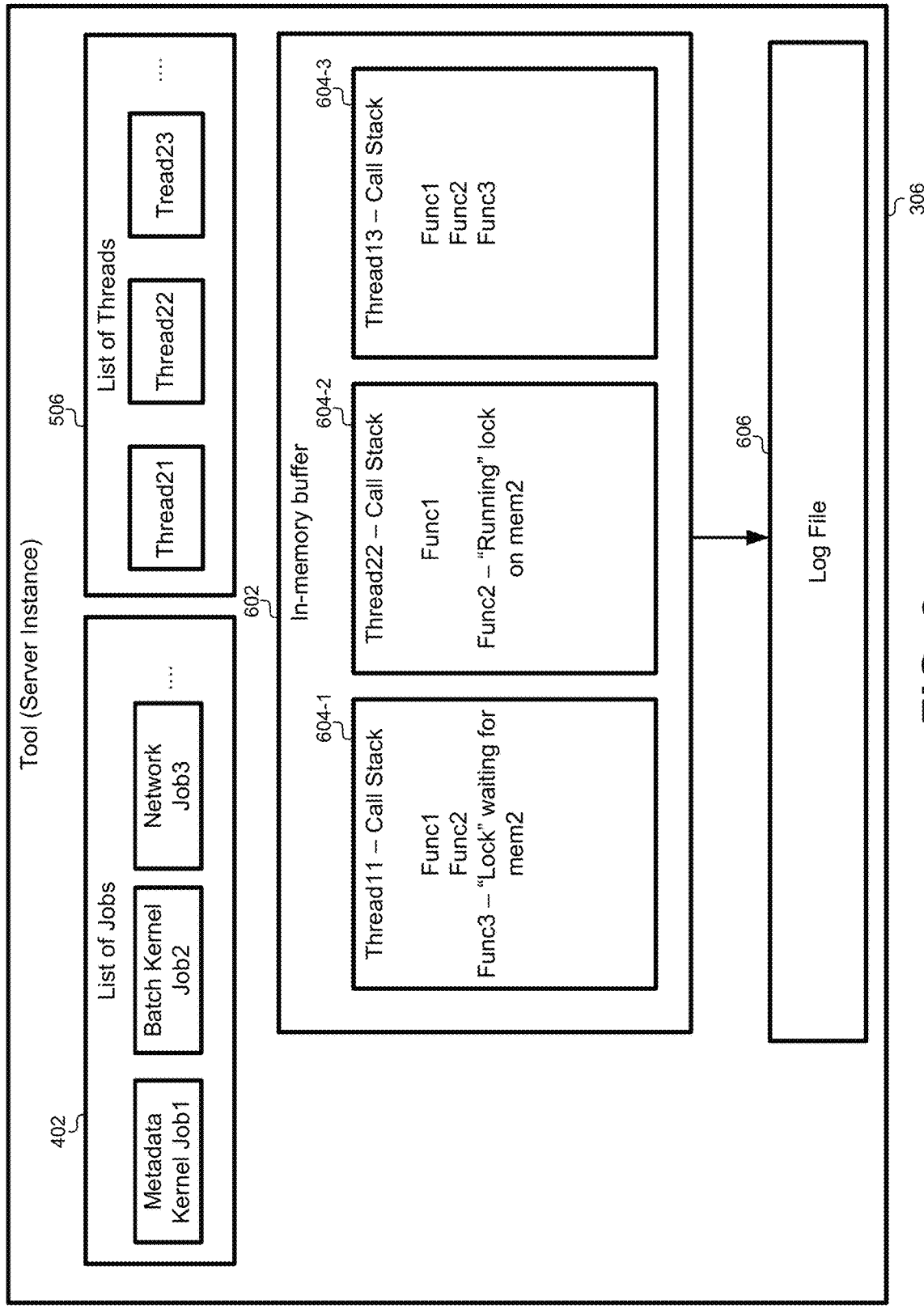
FIG. 6 illustrates how call stacks may be retrieved as part of a batch process, according to some embodiments.

FIG. 6 illustrates how call stacks may be retrieved as part of a batch process, according to some embodiments. As described above, the list of threads may be submitted to the operating system along with a request to return the associated call stacks. The operating system may then receive that request to be processed as a batch request. In response, the tool 306 can provide a buffer 602 that is located in memory into which the results may be stored. As the call stacks 604 are retrieved from the operating system, the buffer 602 may be populated with these results. The call stacks 604 may be represented as sequences of text strings. Once the buffer 602 has been populated with results, the buffer 602 may be flushed to a log file 606. The log file may be configured to receive sets of call stacks as batch responses, storing each batch of call stacks as a "snapshot" of the server instance 100 incrementally over time. Each of the call stacks may be associated with a thread in the list of threads 506.

Figure 7:
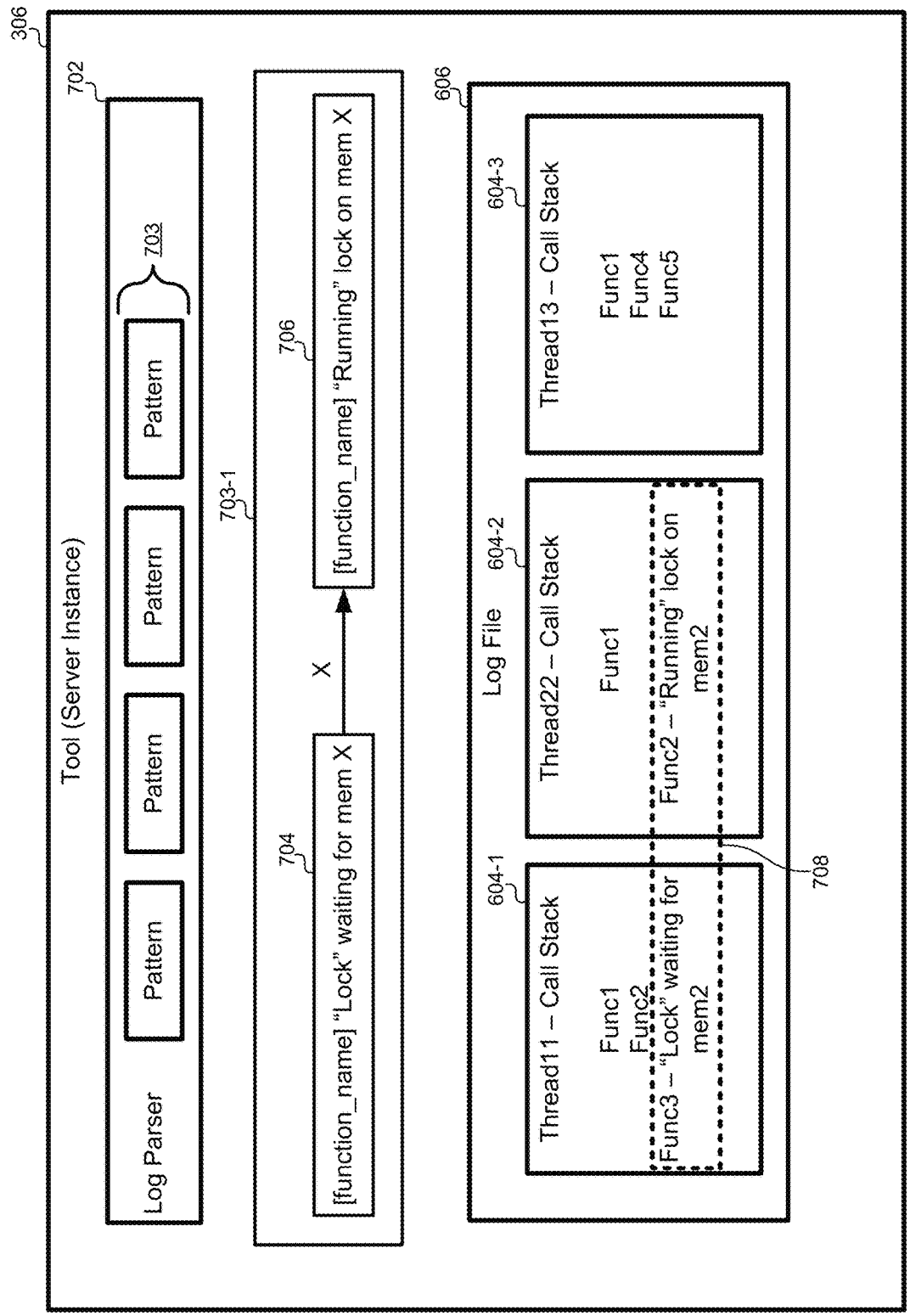
FIG. 7 illustrates how the tool may analyze a log file comprising call stacks to identify patterns that negatively affect the performance of the server instance, according to some embodiments.

FIG. 7 illustrates how the tool may analyze a log file 606 comprising call stacks to identify patterns that negatively affect the performance of the server instance, according to some embodiments. After obtaining a snapshot of the threads currently operating on the server instance 100, tool 306 may store the call stacks in the log file 606. The threads operating on the server instance may change as often as every microsecond. Therefore, the tool 306 may retrieve a list of threads running on the server instance at regular intervals, such as every 1 µs, every 2 µs, every 5 µs, every 10 µs, every 20 µs, every 25 µs, every 30 µs, every 50 µs, every 75 µs, 100 µs and/or other similar intervals. Some embodiments may take snapshots at longer intervals, such as every 1 ms, every 100 ms, every 1 s, and so forth. Each set of call stacks retrieved at these regular intervals may be stored in the log file 606 such that the log file 606 comprises a library of "snapshots" of call stacks during the operation of the server instance. As used herein, the term snapshot refers to a collection of call stacks associated with requests to retrieve current call stacks from the server instance. The snapshot may be associated with a time interval or a timestamp.

The frequency with which call stacks are retrieved and stored in the log file 606 may be different in each embodiment. For example, some embodiments may capture snapshots of call stacks at regular intervals, such as the intervals described above. Other embodiments may monitor a performance of the server instance, and the performance may influence how often call stacks are stored in the log file 606. Performance metrics may include processor usage, memory usage, throughput, bandwidth, number of workloads waiting to be processed, and/or any other metric for measuring performance of a server. Thresholds may be set based on historical usage. For example, when a measured performance metric of the server instance indicates acceptable performance relative to a threshold that historically indicates average performance, the tool 306 may refrain from collecting snapshots of the call stacks or may collect snapshots of call stacks at longer intervals, such as every 1 s. As the performance metric crosses or drops below the threshold indicating that performance may dip below the historical average performance with respect to that metric, the tool 306 may increase the frequency with which snapshots of call stacks are recorded in the log file 606. Thus, as performance of the server instance decreases, the frequency with which the call stacks are collected and stored in the log file 606 may increase.

Any performance metric may be used. Some embodiments may analyze performance based on the log file 606 itself. For example, a number of threads in a snapshot of call stacks may be analyzed to determine whether the number of threads with a "lock" status or a "waiting" status exceeds a threshold number based on a number of waiting workloads to be processed by the server instance. This may indicate that the server instance is not being utilized efficiently, and many threads may consequently be waiting for resources or workloads while a smaller number of threads hold locks on shared system resources.

The call stacks stored in the log file 606 may represent historical data that may be correlated with performance events of the server instance. Therefore, no immediate processing is required for analyzing the log file 606 in real time. Instead, some embodiments may process the contents of the log files 606 off-line. For example, the tool may identify time intervals where the performance of the server instance with respect to a performance metric exceeded a threshold amount. The snapshots of call stacks recorded in the log file 606 during this time interval may be retrieved and processed to identify patterns in the log file 606 that may explain the degraded performance. This analysis process is described in greater detail below.

Alternatively or additionally, the tool 306 may monitor the performance of the server instance in real time and perform a real-time analysis of the snapshots of call stack as they are received and/or recorded in the log file 606. For example, the tool 306 may receive real-time performance metrics from the server instance. If the real-time performance metric exceeds the threshold as described above, the tool 306 may analyze the snapshots of call stacks that are currently or recently received in the log file 606. This allows the tool 306 to identify patterns in the log file 606 the may explain the degraded performance in real time. Alternatively, the tool 306 may flag these snapshots of call stacks for later analysis after they are identified in real time.

The tool 306 may analyze the snapshots of call stacks in the log file 606 using a log parser 702. The log parser 702 may include a process that analyzes text strings in call stacks received in a snapshot using patterns 704 that are known to be associated with performance events at the server instance. The patterns 703 may include regular expressions (e.g., regex or regexp) or other sequences of characters that define a search pattern. Any known regular expression syntax or text pattern may be used. However, the patterns 703 may be configured to identify strings representing function calls and/or statuses in multiple call stacks. Therefore, the patterns may include one or more regular expressions that may be identified in one call stack along with one or more regular expressions that may be identified in another call stack.

Executing one of the patterns 703 on a snapshot of call stacks may include parsing each of the call stacks in the snapshot to identify, for example, function calls in one call stack that match a first portion of the pattern 704 with a corresponding function call in a second call stack that matches a second portion of the pattern 706. The first portion of the pattern 704 may include a regular expression that searches for a status of a thread indicating that it holds a lock on a shared resource in the server instance. For example, the first portion of the pattern 704 may look for a function name in a call stack with a "lock" status waiting for a memory location. For each match found in the call stacks of a particular snapshot, the log parser 702 may populate the second portion of the pattern 706 with a variable from the first portion of the pattern 704. For example, the memory location (e.g., "mem X") found using the first portion of the pattern 704 may be used to complete the second portion of the pattern 706. The remaining call stacks may then be parsed by the log parser 702 using the second portion of the pattern 706 to identify call stacks where the status is "running" with a lock on the same shared resource. Note that the functions identified in the first portion of the pattern 704 and the second portion of the pattern 706 may be reversed. For example, the first portion of pattern 704 may identify threads that hold locks on a shared resource, while the second portion of the pattern 706 may identify threads that are waiting for locks on the shared resource to be released.

When the log parser 702 identifies two or more call stacks in the log file 606 using a pattern, the corresponding function calls in those call stacks may be identified as a source of a potential performance bottleneck. In this example, the pattern 703-1 has identified call stack 604-1 and call stack 604-2. The log parser 702 may output a match 708 that identifies the specific functions in those call stacks 604-1, 604-2, as well as the relationship between the two call stacks 604-1, 604-2 highlighted by the pattern 703-1. Note that this same process may be carried out for each of the patterns 703 loaded into the log parser 702. Each of the patterns 703 may be configured with regular expressions and certain instructions that are configured to identify specific types of potential performance bottlenecks in the log file 606. A single pattern may identify multiple matches in the log file 606, while other patterns may not identify any matches in the log file 606.

The log parser 702 may execute each of the patterns sequentially on snapshots in the log file 606 corresponding to a time interval. When a performance metric of the server instance crosses a performance threshold, the time interval may be identified during which performance has degraded. The log parser 702 may then retrieve snapshots from the log file 606 that were captured during the time interval, and the log parser 702 may execute the patterns 703 on each of the snapshots that are retrieved in this manner.

The examples illustrated in FIG. 7 are not meant to be limiting. For example, a single pattern may identify relationships between more than two call stacks that indicate a potential performance bottleneck. Any type of regular expressions may be used in the patterns 703 that go beyond finding lock/running relationships between threads conflicting over a shared resource. In practice, the log file 606 may include hundreds or thousands of call stacks in each snapshot, and the log file 606 may include thousands of such snapshots.

Figure 8:
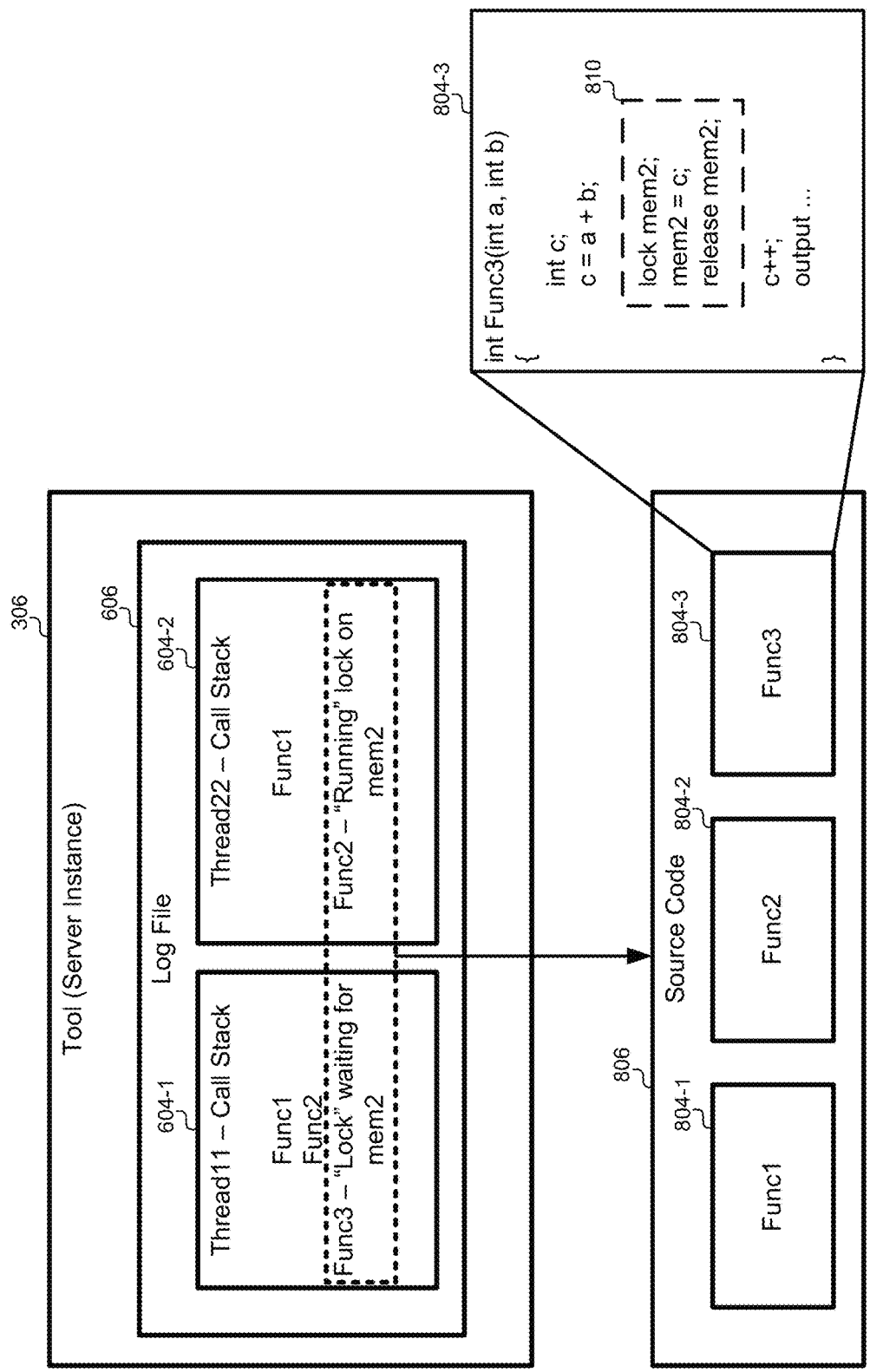
FIG. 8 illustrates an example of how identifying a potential performance bottleneck may trigger an adjustment of the configuration associated with the server instance, according to some embodiments.

FIG. 8 illustrates an example of how identifying a potential performance bottleneck may trigger an adjustment of the configuration associated with the server instance, according to some embodiments. In some embodiments, the solution to the potential performance bottleneck may be to adjust the source code associated with one of the functions identified by the pattern. In this example, Func2 in call stack 604-2 holds a lock on the mem2 location in the shared memory, and Func3 is waiting for the lock to be released on the mem2 location in the shared memory. Some embodiments may allow the tool 306 to automatically access a source code repository 806 for these functions. For example, a source code repository may include files that include the source code 804 for each of the functions that operate as part of the server instance. The tool 306 may retrieve the source code 804 for any functions identified by pattern.

In this example, the source code 804-3 for Func3 may be retrieved from the source code repository 806. The tool 306 may include a user interface that allows a user to select a call stack relationship identified by pattern as a potential performance bottleneck. This input may cause the user interface to automatically retrieve the source code 804-3 and display the source code in the user interface. Some embodiments may also automatically scroll to a location where the affected code is located and/or highlight the associated source code. For example, the user interface may highlight the code 810 that is associated with obtaining a lock or waiting on a lock for a memory location.

The tool 306 may allow the user to directly edit the source code 804-3 in the user interface. Edits made by the user may be stored back into the original source code file in the source code repository 806. This may also trigger a recompilation of the source code 804 and schedule a redeployment of the source code (e.g., upgrade, patch, etc.) to be propagated to the server instance.

Figure 9:
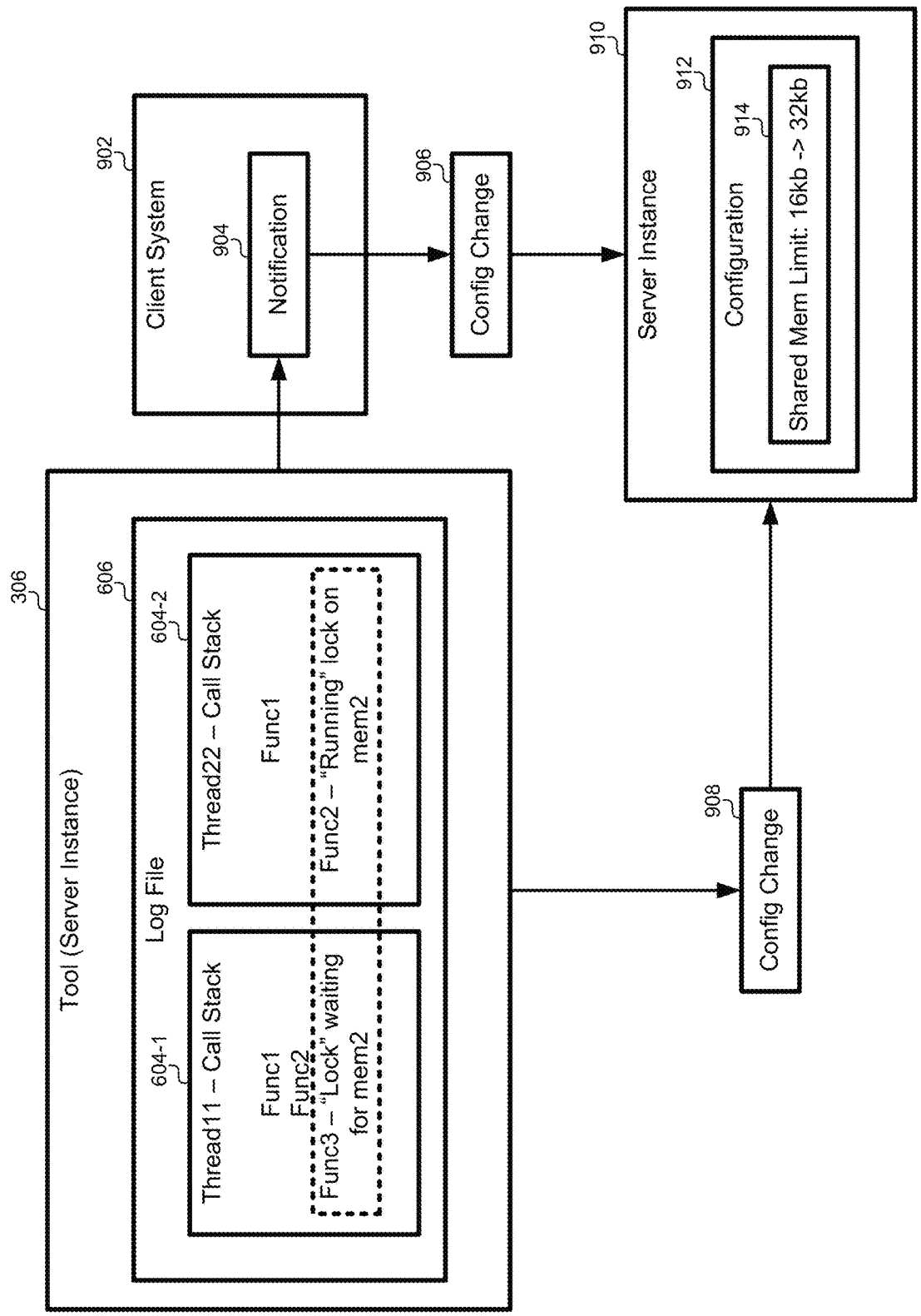
FIG. 9 illustrates another example of how identifying a potential performance bottleneck may trigger an adjustment of the configuration associated with the server instance, according to some embodiments.

FIG. 9 illustrates another example of how identifying a potential performance bottleneck may trigger an adjustment of the configuration associated with the server instance, according to some embodiments. In this example, the configuration of the server instance may include settings or other runtime variables that control how the server instance executes workloads using kernels, threads, etc. as described above. The tool 306 may generate a notification 904 for a client system 902 in which the server instance operates. For example, the server instance may be deployed to the client system 902 and monitored by the tool 306. The tool 306 may monitor the client system 902 remotely, or the tool 306 may be deployed with the server instance at the client system 902.

The notification 904 may include notifications that may be directed to administrators of the client system 902 and/or configuration changes that may be automatically implemented by the client system 902. For example, the notification 904 may include an email or other message to an administrator of the client system 902 that suggests changes to the configuration of the client system 902 that may reduce the likelihood and/or occurrence of the identified performance bottleneck. A specific configuration change 906 may be included in the notification 904, and this configuration change 906 may be carried out manually or automatically with approval from the administrator.

The notification 904 may also include instructions that automatically interface with the server instance 910. For example, the tool 306 may directly transmit a configuration change 908 to the server instance 910. The server instance 910 may receive the configuration change 908 and adjust its configuration accordingly. This process may be carried out with or without additional human intervention. For example, the tool 306 may identify a known performance bottleneck using the patterns described above, and the tool 306 may send a configuration change 906 to the server instance 910. The server instance 910 may then automatically implement the configuration change 906 in real time as the server instance 910 operates or executes without going offline.

In the example of FIG. 9, the tool may have identified a pattern of one call stack waiting on a lock held by the other call stack, where the lock is associated with a memory location in a shared memory in the server instance that is shared between the job kernels. In this example, the adjustment of the configuration may include increasing a shared memory threshold for the server instance. The shared memory threshold may determine when values are stored to the shared memory instead of being passed between threads as parameters, direct messages, and/or the like. For example, a limit may be increased from 16 kB to 32 kB. This may allow values to be passed directly between threads when the associated memory is less than 32 kB. When a data structure passed between threads is greater than 32 kB, then the shared memory may be used. This reduces the number of instances where a thread will hold a lock on the shared memory while another thread waits for that lock to be released.

Figure 10:
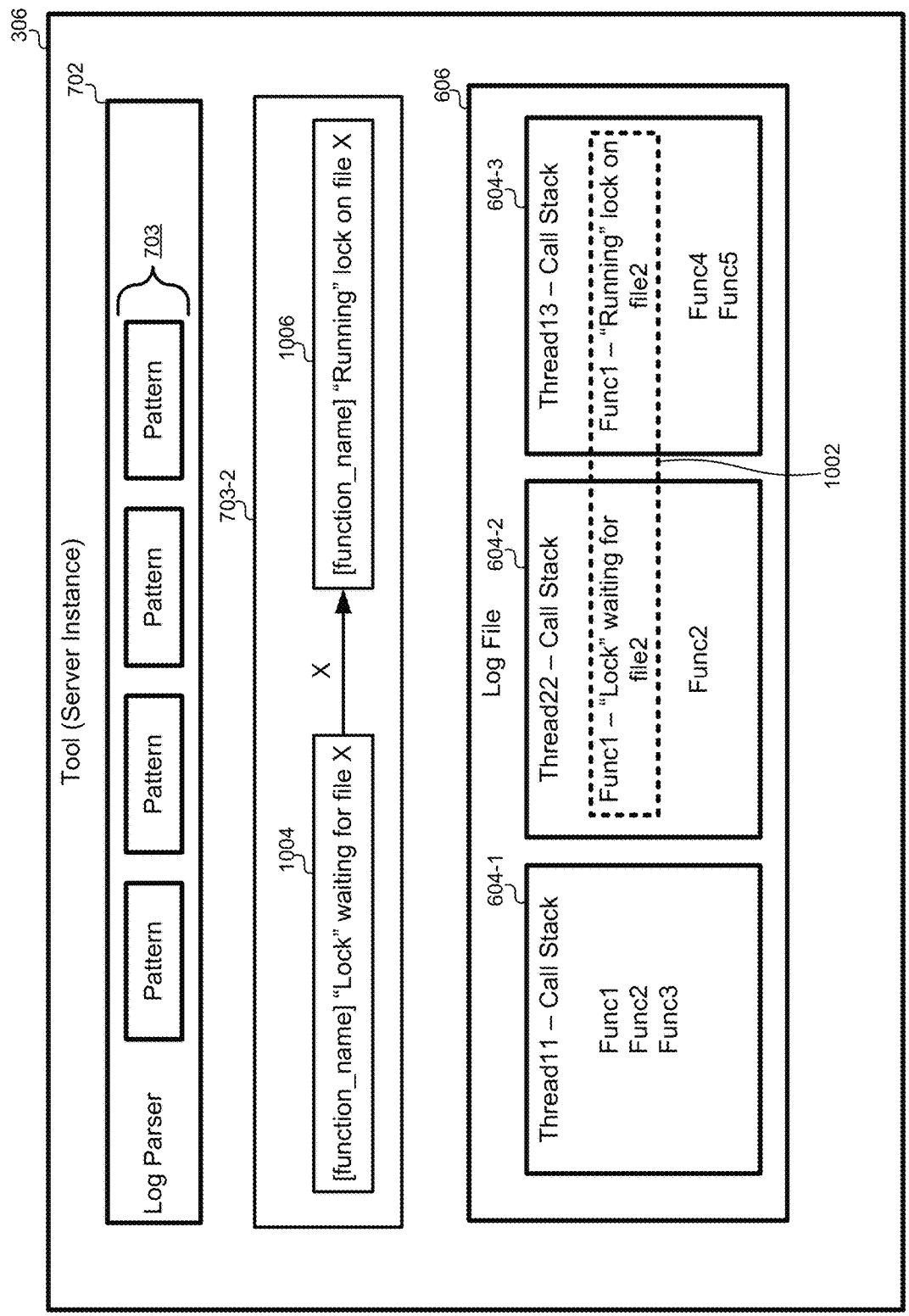
FIG. 10 illustrates an example of a pattern of call stacks using a shared file in a shared disk of the server instance, according to some embodiments.

FIG. 10 illustrates an example of a pattern of call stacks using a shared file in a shared disk of the server instance, according to some embodiments. This example is similar to the example described above in FIG. 7, except that the pattern 703-2 may specifically look for locks on shared disc space rather than shared memory locations in a shared memory. For example, a first portion of the pattern 1004 may search the log file 606 for strings in the call stacks 604 that hold a lock on a shared file. A second portion of the pattern 1006 may take a variable or value, such as a filename, from a call stack string identified by the first portion of the pattern 1004. The second portion of the pattern 1006 may then search the call stacks 604 in the log file 606 for any corresponding call stacks that wait for the lock on the file to be released. A match 1002 may be identified for each pair or group of call stacks that are waiting on the file lock.

Figure 11:
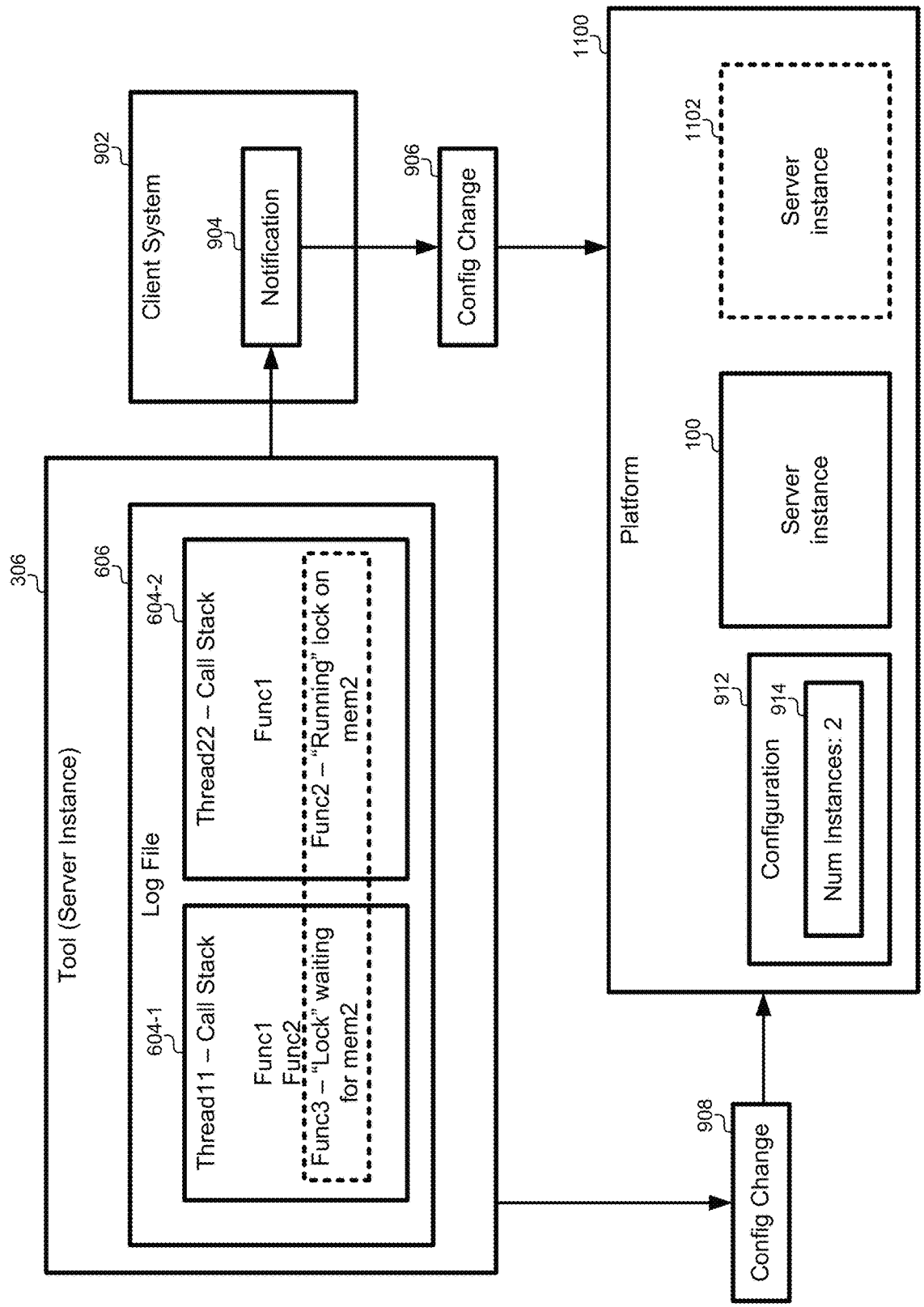
FIG. 11 illustrates an example of how identifying shared memory in the form of a disk file may trigger an adjustment of the configuration associated with the server instance, according to some embodiments.

FIG. 11 illustrates an example of how identifying shared memory in the form of a disk file may trigger an adjustment of the configuration associated with the server instance, according to some embodiments. As described above, identifying a first call stack and a second call stack that hold and wait for a lock on a file may trigger an adjustment of the configuration. The adjustment may include sending a notification 904 to the client system 902 such that a user or administrator of the client system 902 can apply a configuration change 906 to the server instance. The adjustment may also include directly sending the configuration change 908 to be implemented automatically at the server instance.

When threads wait for locks to be released on files, the configuration change 908 may include increasing a number of server instances that are instantiated in a platform 1100. Thus, the configuration associated with the server instance may include a number of server instances that are actively running on the platform 1100. This configuration 912 may be stored on the platform 1100, and a setting 914 may include a number of server instances that will be active on the platform 1100. The configuration change 908 may increase this setting 914 to allow more server instances to operate. For example, when the server instance 100 performs poorly, and this poor performance coincides with more than a threshold number of identified threads waiting on locks on files to be released, the platform 1100 may create an additional server instance 1102 to alleviate the performance bottleneck. Increasing the number of server instances may allow workloads to be shifted to other server instances to perform batch processes. This may result in fewer threads that are waiting for a job to be assigned or waiting for a file lock to be released.

Figure 12:
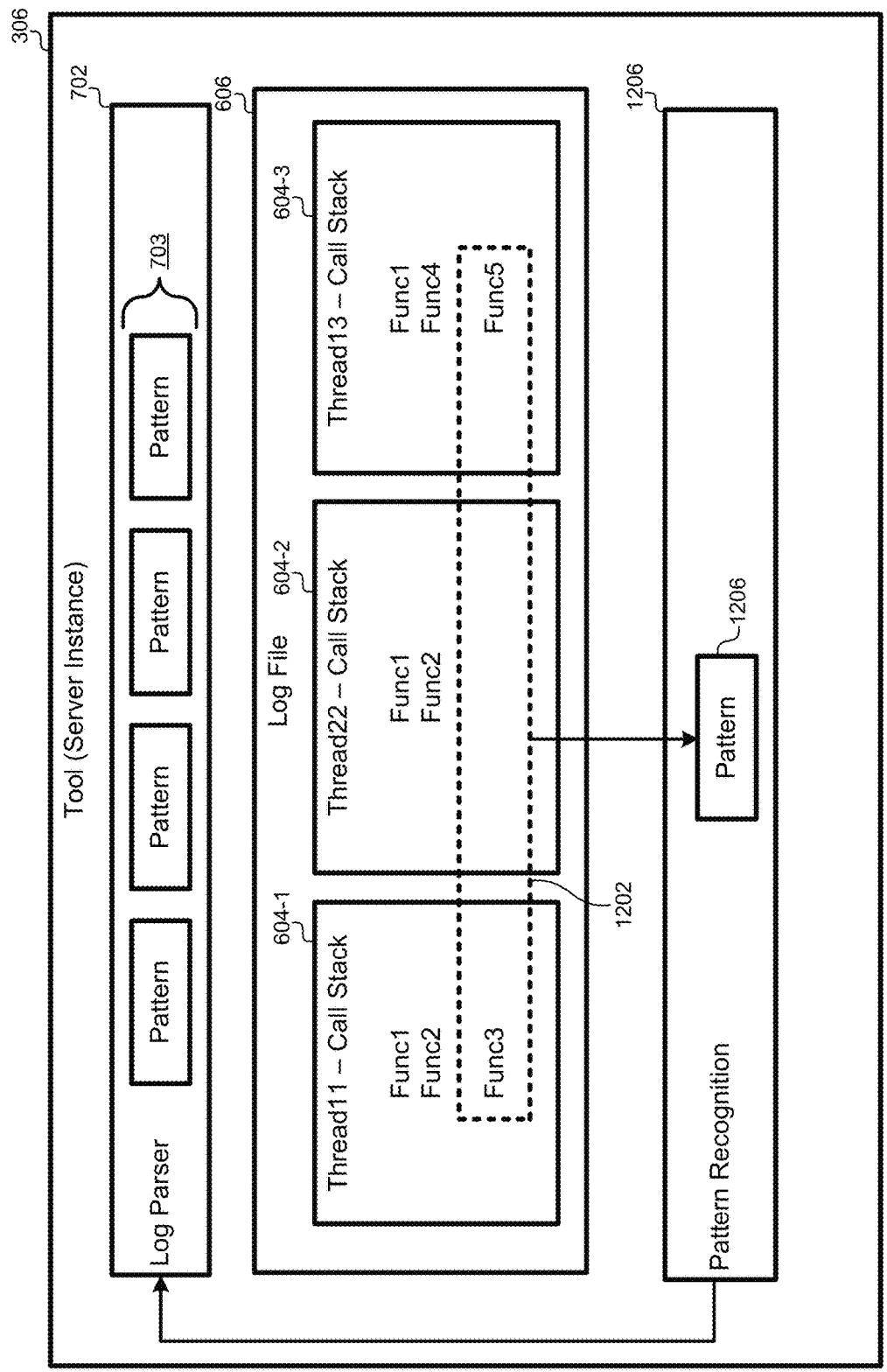
FIG. 12 illustrates how new patterns may be automatically detected and added to the log parser, according to some embodiments.

FIG. 12 illustrates how new patterns may be automatically detected and added to the log parser 702, according to some embodiments. In addition to executing searches based on patterns 703 that have been previously defined, the log parser 702 may also be utilized to identify new patterns that have not yet been identified during instances of poor performance. For example, the tool 306 may receive an indication that the performance of the server instance has fallen below a threshold indicating poor performance. The log parser may analyze snapshots of call stacks that occurred during the time interval of poor performance. For real-time operations, the log parser may analyze snapshots of callstack that are currently being retrieved from the server instance. The patterns 703 that have already been defined may identify relationships between threads that may cause the poor performance as described above.

Additionally, the log parser 702 may identify patterns that have not yet been defined but which occur frequently during instances of poor performance. For example, the log parser 700 to me identify functions that are currently active in the snapshot of call stacks. When these functions are commonly active at the same time when poor performance occurs on the server instance, a relationship 1202 may be established, and a new pattern 1206 may be created to capture that relationship 1202. For example, the log parser 702 may identify a pattern 1206 of locked threads and running threads that occurs more than a threshold number of times across multiple snapshots of call stacks during poor performance. The relationship 1202 may include any common characteristics found in the call stack entry for call stacks 604-1 and call stack 604-3. These common characteristics may be combined into a two-part pattern as described above. The log parser 702 may then generate a new pattern to be added to the group of existing patterns 703 that defines the new thread relationships that have been identified. For example, the log parser 702 may generate a new regular expression that uses text from the call stacks in the new relationship between threads that can be executed as a search against future snapshots of call stacks.

Figure 13:
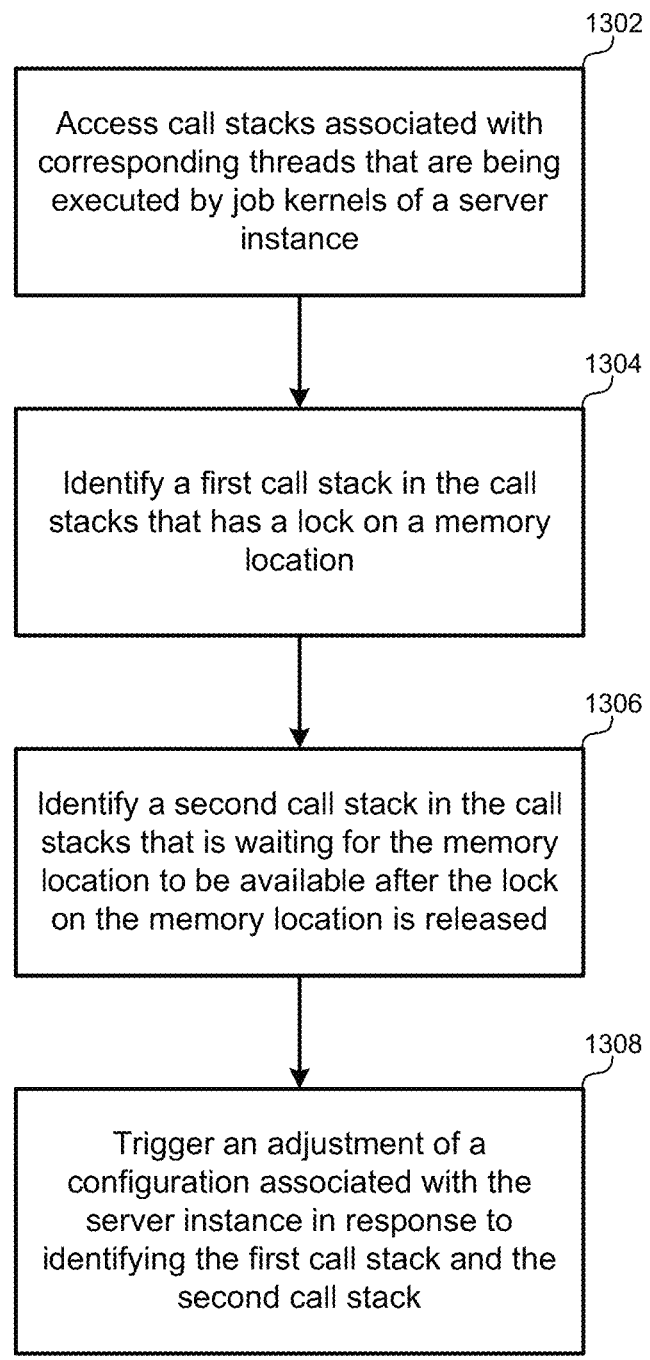
FIG. 13 illustrate a flowchart of a method of identifying dependencies between call stacks in server instances, according to some embodiments.

FIG. 13 illustrate a flowchart of a method of identifying dependencies between call stacks in server instances, according to some embodiments. This method may be carried out by a tool that analyzes a server instance. The server instance may include a plurality of job kernels, each of which may execute one or more threads to process jobs of a workload submitted by a client system or client device. The tool may operate as described above in relation to FIGS. 3-12, and thus the method of FIG. 13 may include any of the features described above.

The method may include accessing a plurality of call stacks associated with a corresponding plurality of threads that are being executed by job kernels on a server instance (1302). The plurality of call stacks may be retrieved from an operating system of the server instance using a list of threads and/or a list of jobs currently executing on the server instance. The list of jobs may be maintained at the tool and may be regularly updated from the server instance. The call stacks may include text strings or other symbols that indicate function calls and/or addresses. The call stacks may also include a status, such as a lock status, a running status, a waiting status, and/or other statuses described above. The call stacks may be accessed in response to a determination that a performance metric of the server instance is below a threshold level of performance.

The method may also include identifying a first call stack in the plurality of call stacks that has a lock on a memory location (1304). The tool may include a log parser that stores or accesses patterns that identify lock/waiting relationships between the call stacks of different threads. The pattern may include a first portion of the pattern that identifies the first call stack. For example, the first portion of the pattern may search for any thread that is currently holding for a lock. The memory location may include a memory location in a shared memory, a shared file in a shared disk, and/or any other type of memory location without limitation. Some embodiments need not be limited to detecting locks on memory location, and the methods described above may be used without limitation for any computing resource.

The method may additionally include identifying a second call stack in the plurality of call stacks that is waiting for the memory location to be available after the lock on the memory location is released (1306). The second call stack may be identified using a second portion of the pattern. The second portion of the pattern may use a value from the first call stack, such as a name or address of the memory location that is locked or waiting for a lock to be released. Note that multiple second call stacks may be identified in this process. For example, multiple threads may be waiting for a lock to be released by the thread associated with the first call stack.

The method may further include triggering an adjustment of a configuration associated with the server instance in response to identifying the first call stack and the second call stack (1308). Triggering the adjustment may include sending a configuration change directly to the server instance or to a platform on which the server instance operates. Triggering the adjustment may also include sending a notification to a user to implement a configuration change. The configuration change may include adjusting a shared memory threshold, adjusting a number of server instances operating on the platform, and/or any other setting associated with the operation of the server instance.

The method of the flowchart illustrated in FIG. 13 may be executed in real time as performance metrics are measured and evaluated. The adjustment may be triggered as call stacks identified by the tool to implement real-time changes to the configuration associated with the server instance. Alternatively or additionally, this method may be executed after the performance of the server instance has improved. For example, the tool may identify a previous interval of poor performance for the server instance and retrieve a plurality of snapshots of call stacks from a log file. The snapshots of call stacks may be analyzed individually to identify call stack relationships as described above. Additionally, the snapshots of call stacks may be analyzed to identify new patterns as described above in relation to FIG. 12.

It should be appreciated that the specific steps illustrated in FIG. 12 provide particular methods of identifying dependencies between call stacks and server instances according to various embodiments. Other sequences of steps may also be performed according to alternative embodiments. For example, alternative embodiments may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 14:
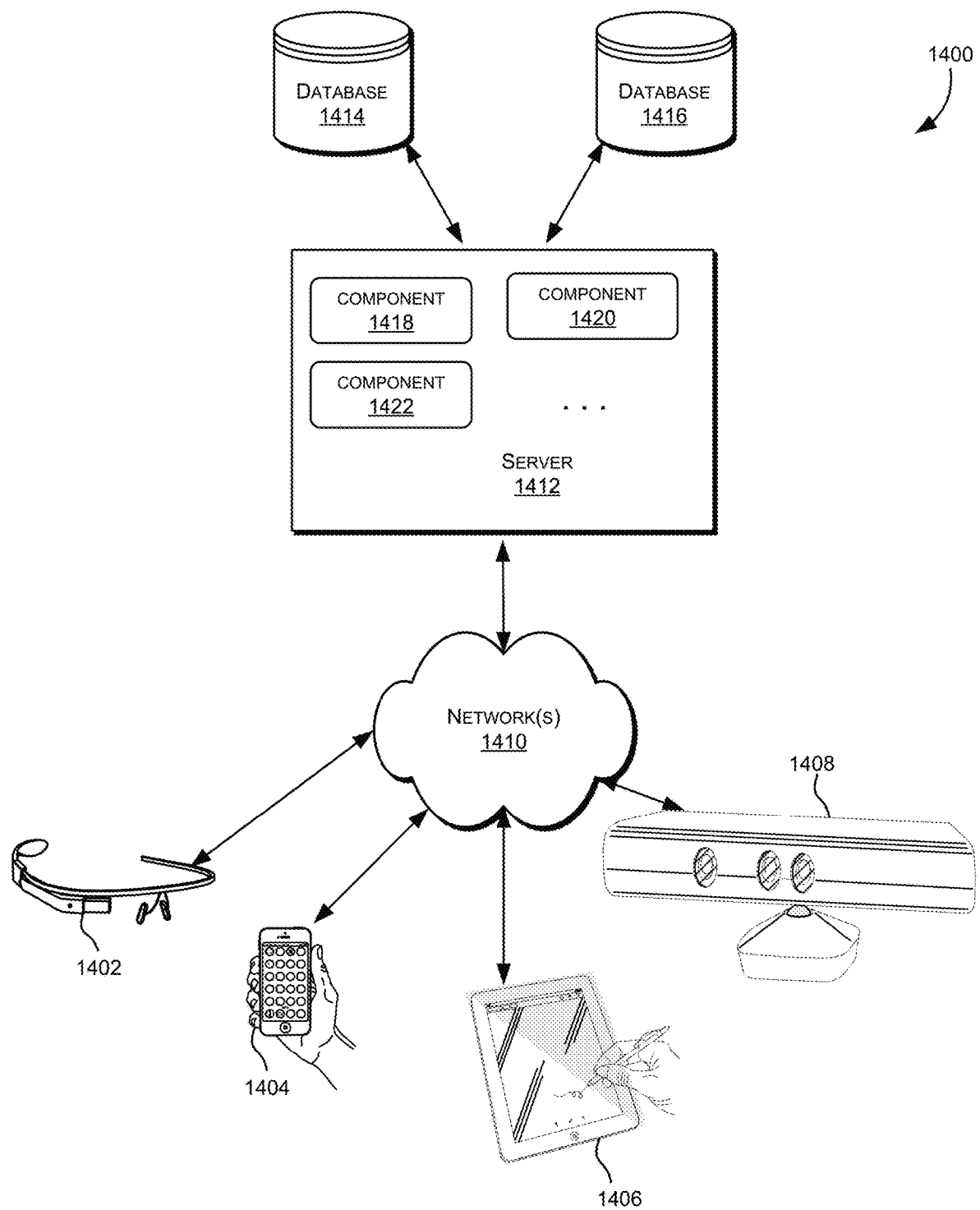
FIG. 14 illustrates a simplified block diagram of a distributed system for implementing some of the embodiments.

FIG. 14 depicts a simplified diagram of a distributed system 1400 for implementing one of the embodiments. In the illustrated embodiment, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with remote client computing devices 1402, 1404, 1406, and 1408 via network 1410.

In various embodiments, server 1412 may be adapted to run one or more services or software applications provided by one or more of the components of the system. In some embodiments, these services may be offered as web-based or cloud services or under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in the figure, the software components 1418, 1420 and 1422 of system 1400 are shown as being implemented on server 1412. In other embodiments, one or more of the components of system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The embodiment shown in the figure is thus one example of a distributed system for implementing an embodiment system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with four client computing devices, any number of client computing devices may be supported. Other devices, such as devices with sensors, etc., may interact with server 1412.

Network(s) 1410 in distributed system 1400 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1412 may be adapted to run one or more services or software applications described in the foregoing disclosure. For example, server 1412 may correspond to a server for performing processing described above according to an embodiment of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of embodiments, databases 1414 and 1416 may reside in a storage-area network (SAN). Similarly, any necessary files for performing the functions attributed to server 1412 may be stored locally on server 1412 and/or remotely, as appropriate. In one set of embodiments, databases 1414 and 1416 may include relational databases, such as databases provided by Oracle, that are adapted to store, update, and retrieve data in response to SQL-formatted commands.

Figure 15:
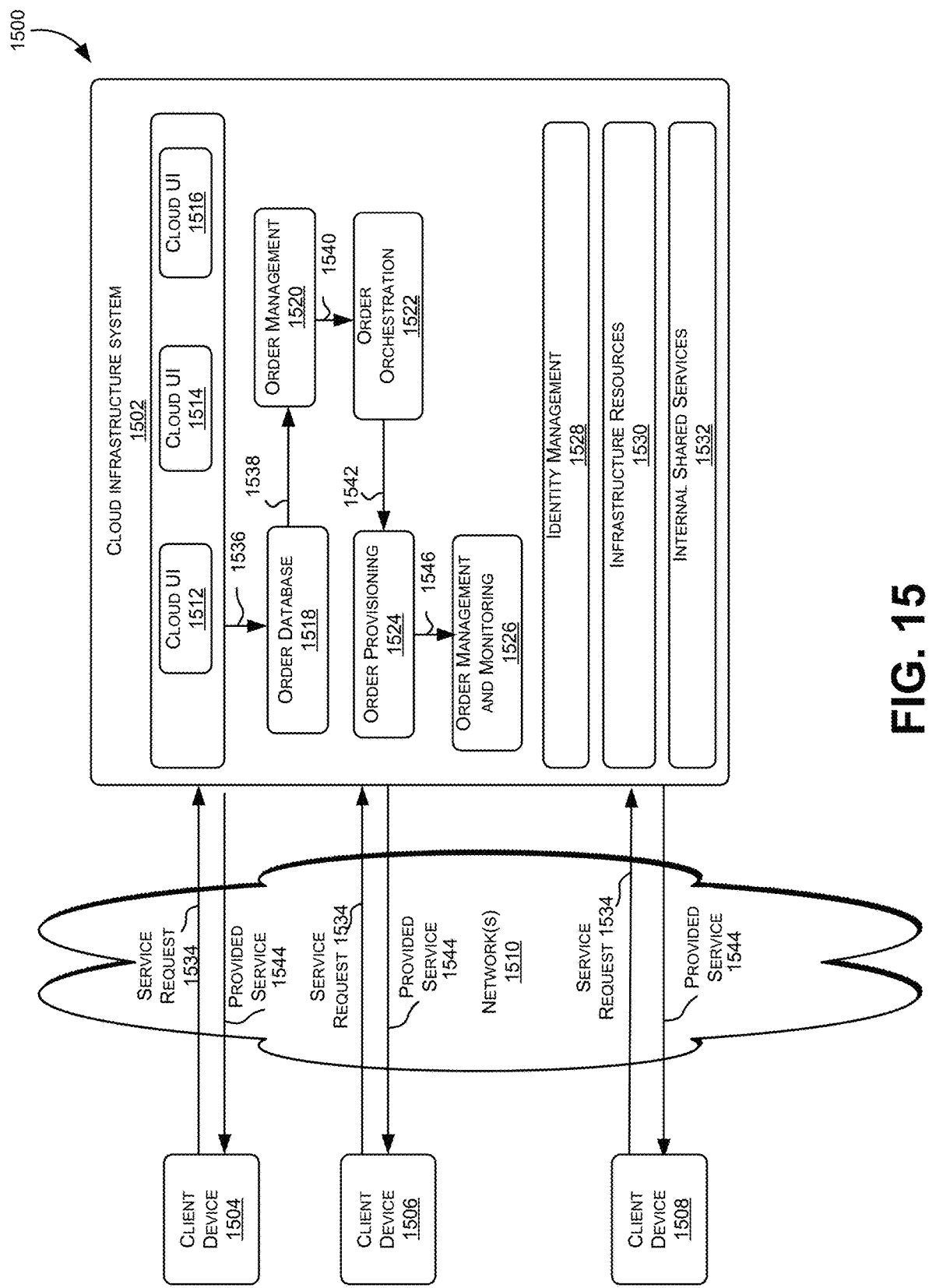
FIG. 15 illustrates a simplified block diagram of components of a system environment by which services provided by the components of an embodiment system may be offered as cloud services.

FIG. 15 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the system shown in the figure is only one example of a cloud infrastructure system that may incorporate some embodiments. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for 1402, 1404, 1406, and 1408.

Although exemplary system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network that can support data communications using any of a variety of commercially-available protocols, including those described above for network(s) 1410.

Cloud infrastructure system 1502 may comprise one or more computers and/or servers that may include those described above for server 1412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In exemplary operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516.

At operation 1536, the order is stored in order database 1518. Order database 1518 can be one of several databases operated by cloud infrastructure system 1518 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1500 may include an identity management module 1528. Identity management module 1528 may be configured to provide identity services, such as access management and authorization services in cloud infrastructure system 1500. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

Figure 16:
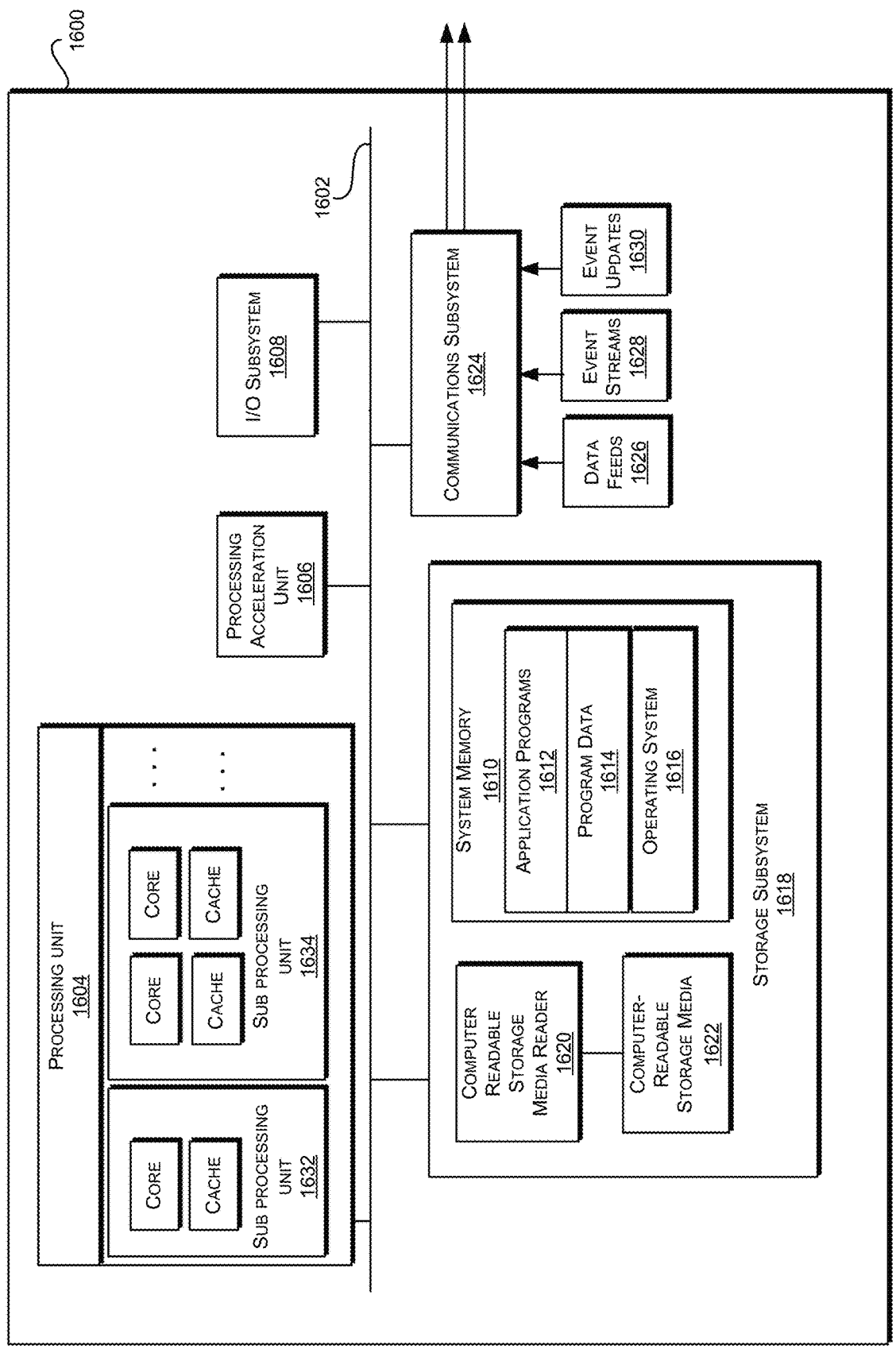
FIG. 16 illustrates an exemplary computer system, in which various embodiments may be implemented.

FIG. 16 illustrates an exemplary computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/ or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with some embodiments.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
    accessing a plurality of call stacks associated with a corresponding plurality of threads that are being executed by job kernels on a server instance;
    identifying a first call stack in the plurality of call stacks that has a lock on a memory location;
    identifying a second call stack in the plurality of call stacks that is waiting for the memory location to be available after the lock on the memory location is released at least in part by matching a second reference to the memory location in a line of the second call stack to a first reference to the memory location in a line of the first call stack; and
    triggering an adjustment of a configuration associated with the server instance in response to identifying the first call stack and the second call stack.

2. The non-transitory computer-readable medium of claim 1, wherein the first call stack comprises a string that represents a status of an associated thread, and the status indicates that the associated thread holds the lock on the memory location.

3. The non-transitory computer-readable medium of claim 1, wherein the second call stack comprises a string that represents a status of an associated thread, and the status indicates that the associated thread is waiting for the memory location to be available after the lock on the memory location is released.

4. The non-transitory computer-readable medium of claim 1, wherein a third call stack comprises a string that represents a status of an associated thread, and the status indicates that the associated thread is waiting to be assigned a job by the server instance.

5. The non-transitory computer-readable medium of claim 1, wherein the operations further comprise:
    accessing a list of jobs currently executing on the server instance;
    submitting a request to an operating system of the server instance to retrieve a list of threads currently executing for the list of jobs; and
    submitting a request to the operating system of the server instance to retrieve the plurality of call stacks for the list of threads.

6. The non-transitory computer-readable medium of claim 5, wherein the list of jobs is stored locally by a process that executes on a second server instance.

7. The non-transitory computer-readable medium of claim 5, wherein the operations further comprise:
receiving an update to the list of jobs from the server instance.

8. The non-transitory computer-readable medium of claim 1, wherein identifying the first call stack and identifying the second call stack comprises:
accessing a text pattern that identifies lock dependencies between threads; and
executing a text search on strings in the plurality of call stack to match a first portion of the text pattern to the first call stack and a second portion of the text pattern to the second call stack, wherein the second portion of the text pattern includes a value from the first call stack identifying the memory location.

9. The non-transitory computer-readable medium of claim 1, wherein the memory location comprises a shared memory in the server instance that is shared between the job kernels.

10. The non-transitory computer-readable medium of claim 9, wherein the adjustment of the configuration comprises increases a shared memory threshold for the server instance that determines when values are stored to the shared memory instead of being passed between threads.

11. The non-transitory computer-readable medium of claim 1, wherein triggering the adjustment of the configuration comprises sending a notification of the adjustment to a user of the server instance.

12. The non-transitory computer-readable medium of claim 1, wherein triggering the adjustment of the configuration comprises automatically changing the configuration of the server instance without requiring human intervention.

13. The non-transitory computer-readable medium of claim 1, wherein the memory location comprises a shared disk of the server instance that is shared between the job kernels.

14. The non-transitory computer-readable medium of claim 13, wherein the adjustment of the configuration comprises creating a new server instance to reduce a number of jobs waiting to be assigned to kernels that prepare or use the shared disk.

15. The non-transitory computer-readable medium of claim 13, wherein the first call stack is associated with a first thread executing in a metadata kernel, and the second call stack is associated with a second thread executing in a batch kernel.

16. The non-transitory computer-readable medium of claim 1, wherein the operations further comprise:
accessing a plurality of snapshots of call stacks during a time interval when performance of the server instance drops below a threshold performance level;
identifying a pattern in that occurs in multiple call stacks in the plurality of snapshots of call stacks; and
using the pattern to identify lock relationships between call stacks during a subsequent time when the performance of the server instance drops below the threshold performance level.

17. The non-transitory computer-readable medium of claim 1, wherein accessing the plurality of call stacks occurs in response to a determination that a performance metric of the server instance is below a threshold level of performance.

18. The non-transitory computer-readable medium of claim 17, wherein the determination that the performance metric of the server instance is a real-time determination, and the adjustment of the configuration is triggered as the server instance operates.

19. A method of identifying dependencies between call stacks in server instances, the method comprising:
accessing a plurality of call stacks associated with a corresponding plurality of threads that are being executed by job kernels on a server instance;
identifying a first call stack in the plurality of call stacks that has a lock on a memory location;
identifying a second call stack in the plurality of call stacks that is waiting for the memory location to be available after the lock on the memory location is released at least in part by matching a second reference to the memory location in a line of the second call stack to a first reference to the memory location in a line of the first call stack; and
triggering an adjustment of a configuration associated with the server instance in response to identifying the first call stack and the second call stack.

20. A system comprising:
one or more processors; and
one or more memory devices comprising instructions that, when executed by the one or more processors, cause the one or more processors to perform operations comprising:
accessing a plurality of call stacks associated with a corresponding plurality of threads that are being executed by job kernels on a server instance;
identifying a first call stack in the plurality of call stacks that has a lock on a memory location;
identifying a second call stack in the plurality of call stacks that is waiting for the memory location to be available after the lock on the memory location is released at least in part by matching a second reference to the memory location in a line of the second call stack to a first reference to the memory location in a line of the first call stack; and
triggering an adjustment of a configuration associated with the server 13 instance in response to identifying the first call stack and the second call stack.

* * * * *

UNITED STATES PATENT AND TRADEMARK OFFICE
CERTIFICATE OF CORRECTION

| | | |
|---|---|---|
| PATENT NO. | : 11,915,062 B2 | |
| APPLICATION NO. | : 17/125319 | |
| DATED | : February 27, 2024 | |
| INVENTOR(S) | : Pandey | |

It is certified that error appears in the above-identified patent and that said Letters Patent is hereby corrected as shown below:

In the Drawings

On sheet 4 of 16, in FIG. 4, under Reference Numeral 406, Line 2, delete "Tread23" and insert -- Thread23 --, therefor.

On sheet 5 of 16, in FIG. 5, under Reference Numeral 506, Line 2, delete "Tread23" and insert -- Thread23 --, therefor.

On sheet 6 of 16, in FIG. 6, under Reference Numeral 506, Line 2, delete "Tread23" and insert -- Thread23 --, therefor.

In the Specification

In Column 1, Line 24, delete "work loads." and insert -- workloads. --, therefor.

In Column 8, Line 61, delete ""Thread 22."" and insert -- "Thread22." --, therefor.

In Column 10, Line 53, delete "the" and insert -- that --, therefor.

In Column 14, Line 18, delete "callstack" and insert -- call stack --, therefor.

In Column 17, Line 37, delete "Internet" and insert -- Internetwork --, therefor.

In the Claims

In Column 29, Line 52, in Claim 16, delete "pattern in" and insert -- pattern --, therefor.

In Column 30, Line 50, in Claim 20, after "server" delete "13", therefor.

Signed and Sealed this
Twenty-third Day of July, 2024

*Katherine Kelly Vidal*
Katherine Kelly Vidal
*Director of the United States Patent and Trademark Office*